(12) United States Patent
Gong et al.

(10) Patent No.: US 8,670,255 B2
(45) Date of Patent: Mar. 11, 2014

(54) UTILIZATION OF A MULTIFUNCTIONAL PIN COMBINING VOLTAGE SENSING AND ZERO CURRENT DETECTION TO CONTROL A SWITCHED-MODE POWER CONVERTER

(75) Inventors: Xiaowu Gong, Singapore (SG); Meng Kiat Jeoh, Singapore (SG); Dong Li, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 1184 days.

(21) Appl. No.: 12/209,451

(22) Filed: Sep. 12, 2008

(65) Prior Publication Data

US 2010/0066337 A1    Mar. 18, 2010

(51) Int. Cl.
*H02M 5/42* (2006.01)
*H02M 7/04* (2006.01)
*H02M 7/68* (2006.01)

(52) U.S. Cl.
USPC ............................................. 363/89

(58) Field of Classification Search
USPC .............................. 363/44, 89–90
See application file for complete search history.

(56) References Cited

U.S. PATENT DOCUMENTS

| 4,677,366 | A   |   | 6/1987  | Wilkinson et al. |        |
|-----------|-----|---|---------|------------------|--------|
| 5,757,635 | A   | * | 5/1998  | Seong            | 363/89 |
| 5,798,635 | A   |   | 8/1998  | Hwang et al.     |        |
| 6,008,590 | A   |   | 12/1999 | Giannopoulos et al. |     |
| 6,191,566 | B1  |   | 2/2001  | Petricek et al.  |        |
| 6,304,462 | B1  |   | 10/2001 | Balakrishnan et al. |     |
| 6,437,547 | B2  |   | 8/2002  | Petricek et al.  |        |
| 6,608,770 | B2  | * | 8/2003  | Vinciarelli et al. | 363/61 |
| 7,233,131 | B2  |   | 6/2007  | Lin et al.       |        |
| 7,339,359 | B2  |   | 3/2008  | Choi et al.      |        |
| 7,733,678 | B1  | * | 6/2010  | Notohamiprodjo et al. | 363/89 |
| 7,990,740 | B1  | * | 8/2011  | Notohamiprodjo et al. | 363/89 |

FOREIGN PATENT DOCUMENTS

WO    WO 01/18556  A1    3/2001

OTHER PUBLICATIONS

Infineon Technologies AP, "ICE3Axxx/ICE3Bxxx—CoolSET F3 Design Guide," Application Note, V1.0, Aug. 2004, pp. 1-17.
Infineon Technologies AP, "ICE3A/BS02 Current Mode Controller with integrated 500V Startup Cell," Application Note, Ver1.0, 0504, Date Unknown, pp. 1-17.
Infineon Technologies AG, "CoolSET™ F3 Family—ICE3XXXXX Series," 2004, 2 pgs.
STMicroelectronics, "L6599—High-voltage resonant controller," Jul. 2006, pp. 1-36.

(Continued)

*Primary Examiner* — Jue Zhang
(74) *Attorney, Agent, or Firm* — Slater & Matsil, L.L.P.

(57) ABSTRACT

An embodiment of the invention relates to a power converter including an inductor coupled in series with a power switch and a resistor coupled to a winding of the inductor. Input and output power converter voltages including an input brownout condition or an output overvoltage condition are estimated, and the output voltage may be regulated, by sensing a current in the resistor. An input current waveform can thereby be controlled to replicate substantially the input voltage waveform. The controller adjusts an on time and terminates an off time of the power switch by sensing respectively a current and a change of current in the resistor. The controller may sense a current flowing in the resistor to select a line voltage range of the input voltage to the power converter. The controller may estimate an input current to the power converter employing the current flowing in the resistor.

23 Claims, 14 Drawing Sheets

(56) References Cited

OTHER PUBLICATIONS

Texas Instruments, "TL431, TL431A, TL431B, TL432, TL432A, TL432B—Adjustable Precision Shunt Regulators," Various Dates, 67 pgs.

Semiconductor Component Industries, LLC, ON Semiconductor, "NCP1395A/B—High Performance Resonant Mode Controller," Rev. 1, Mar. 2006, pp. 1-27.

Power Integrations, Inc., "TOP232-234—*TOPSwitch®*—*FX* Family—Design Flexible, *EcoSmart®*, Integrated Off-line Switcher," Jul. 2001, pp. 1-36.

Todd, Philip C., "UC3854 Controlled Power Factor Correction Circuit Design," Texas Intruments' Application Note U-134, 1999, pp. 3-269-3-289.

Hwang, et al., "New Universal Control Methods for Power Factor Correction and DC to DC Converter Applications," IEEE Applied Electronics Conference, vol. 1, Feb. 23, 1997, pp. 59-65.

Qiu, D.-Y., et al., "Single Current Sensor Control for Single-Phase Active Power Factor Correction," IEEE Transactions on Power Electronics, Sep. 2002, vol. 17, Issue: 5, pp. 623-632.

Semiconductor Components Inductries, LLC , On Semiconductor, "NCP1606 Cost Effective Power Factor Controller," Nov. 2007, Rev. 5, pp. 1-22.

\* cited by examiner

UTILIZATION OF A MULTIFUNCTIONAL PIN COMBINING VOLTAGE SENSING AND ZERO CURRENT DETECTION TO CONTROL A SWITCHED-MODE POWER CONVERTER

CROSS-REFERENCE TO RELATED APPLICATION

This application relates to the following co-pending and commonly assigned patent application: Ser. No. 12/192,399, filed Aug. 15, 2008, entitled "Novel Utilization of a Multifunctional Pin to Control a Switched-Mode Power Converter," which application is hereby incorporated herein by reference.

TECHNICAL FIELD

An embodiment of the invention relates generally to electronic power conversion and methods, and more particularly to the use of a circuit node to control a power switch in a switched-mode power converter.

BACKGROUND

A switched-mode power converter (also referred to as a "power converter" or "regulator") is a power supply or power processing circuit that converts an input voltage waveform into a specified output voltage waveform. DC-DC power converters convert a dc input voltage which may be time varying into a dc output voltage. Controllers associated with the power converters manage an operation thereof by controlling the conduction periods of switches employed therein. Generally, the controllers are coupled between an input and output of the power converter in a feedback loop configuration (also referred to as a "control loop" or "closed control loop").

Typically, the controller measures an output characteristic (e.g., an output voltage, an output current, or a combination of an output voltage and an output current) of the power converter, and based thereon modifies a duty cycle of the power switches of the power converter. The duty cycle is a ratio represented by a conduction period of a power switch to a switching period thereof. Thus, if a switch conducts for half of the switching period, the duty cycle for the power switch would be 0.5 (or 50%). Additionally, as voltage or current for systems, such as a microprocessor powered by the power converter, dynamically change (e.g., as a computational load on a load microprocessor changes), the controller should be configured to dynamically increase or decrease the duty cycle of the power switches therein to maintain an output characteristic such as an output voltage at a desired value.

In an exemplary application, the power converters have the capability to boost a time-varying input voltage, such as a rectified 120 V ac line voltage, to a higher, regulated output voltage, such as 400 V dc, to power a load. To provide the voltage conversion and regulation functions, the power converters include active power switches such as metal-oxide semiconductor field-effect transistors ("MOSFETs") that are coupled to the input voltage source and periodically switch a reactive circuit element such as an inductor to the voltage source at a switching frequency that may be on the order of 100 kHz or higher.

Power converters coupled to an ac line are generally required to draw instantaneous line current waveform substantially proportional to the waveform of the ac line voltage. Such an arrangement substantially minimizes the root mean square ("RMS") current drawn by the power converter for a given output power level. Control arrangements that draw a line current waveform proportional to the waveform of the ac line voltage are generally referred to as power factor controlled ("PFC").

A controller for a power converter is generally formed as an integrated circuit with conductive pins that are soldered or otherwise electrically bonded to a printed wiring board in an end product. A design issue for power converters is the number of pins (physical circuit nodes) that is required for power converter control and for interactions with external system elements. For example, in a PFC control application a plurality of pins is generally required to sense an input line voltage, an input line current, and a power converter output voltage. The input line voltage is sensed for the PFC control function and to sense a brownout condition of the ac input line voltage so that the power converter can be protectively shut down at low input line voltages. The input line current is sensed for the PFC control function. The output voltage is also sensed for a protective and a regulation function. The utilization of a plurality of external pins to provide these functions incurs cost and physical space in a power converter design.

Several design approaches to providing power factor correction have been developed in recent years that have required progressively fewer pins. For example, some approaches avoid the need to accurately sense an input voltage or an input current. However, a practical implementation of a power converter employing power factor correction requires that the input line voltage be accurately sensed so that the power converter can be protected against an input voltage "brownout" condition wherein the RMS input line voltage is too low to support normal power converter operation. In addition, a practical implementation also requires that the power converter accurately sense output voltage to protect against an output overvoltage (or undervoltage) condition and for regulation of the output voltage. Accordingly, recent conventional design approaches have required the addition of physical pins to provide these protective and regulation features in a practical implementation.

Thus, there is a need for a process and related method to provide PFC control and protection functions for a switched-mode power converter with a minimal number of pins that avoids the disadvantages of conventional approaches.

SUMMARY OF THE INVENTION

In accordance with an exemplary embodiment, a power converter and a related method are provided. In an embodiment, the power converter includes a power switch and an inductor coupled in series with the power switch. The inductor includes a primary winding and a secondary winding. The power converter further includes a resistor coupled in series with the secondary winding and a controller including a circuit node coupled to the resistor, wherein the controller is configured to estimate a terminal voltage of the power converter by sensing a current flowing in the resistor to control a duty cycle of the power switch. The controller is configured to estimate an input voltage and an output voltage of the power converter by sensing the current flowing in the resistor. In an embodiment, the controller controls the duty cycle of the power switch to produce an input current waveform to the power converter that substantially replicates the waveform of an input voltage to the power converter by sensing the current flowing in the resistor. The controller may regulate an output voltage of the power converter by employing the current flowing in the resistor. In an embodiment, the controller employs the current flowing in the resistor to sense a brownout condition of the input voltage to the power converter to disable conduction of the power switch in response to sensing the brownout condition. In an embodiment, the controller employs the current flowing in the resistor to sense an output overvoltage condition of the power converter. In an embodiment, the controller terminates an off time of the power switch by sensing a change of current flowing in the resistor. In an embodiment, the controller adjusts an on time of the power switch in response to a current flowing in the resistor. In an embodiment, the controller senses a current flowing in the resistor to select a line voltage range of the input voltage to the power converter.

In a further embodiment, the controller estimates an input current to the power converter employing the current flowing in the resistor. In an embodiment, the controller employs estimates of the input voltage and the output voltage to the power converter and the estimate of an input current to the power converter with a multiplication operation to control the duty cycle of the power switch, wherein each estimate is produced by sensing the current flowing in the resistor.

In an embodiment, the power converter is a boost power converter operated substantially in a critical or in a continuous conduction mode. In an embodiment, the input voltage to the power converter is a rectified ac line voltage.

BRIEF DESCRIPTION OF THE DRAWINGS

The details of one or more embodiments of the invention are set forth in the accompanying drawings and the description below. Other features, objects, and advantages of the invention will be apparent from the description and drawings, and from the claims. In the figures, identical reference symbols generally designate the same component parts throughout the various views, which will generally not be redescribed in the interest of brevity. For a more complete understanding of the invention, reference is now made to the following descriptions taken in conjunction with the accompanying drawings, in which:

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to exemplary embodiments in a specific context, namely a switched-mode power converter that provides power factor correction for an input current waveform with multiple uses of a pin.

An embodiment of the invention may be applied to various electronic power conversion devices, for example, to a power converter to produce a regulated, boosted output voltage from an unregulated ac line input voltage. Other electronic power conversion devices can be constructed that employed power factor correction and multiple use of a pin as introduced herein in different contexts using inventive concepts described herein, for example, a power amplifier or a motor controller applied in an entertainment, communications, or industrial environment.

Figure 1:
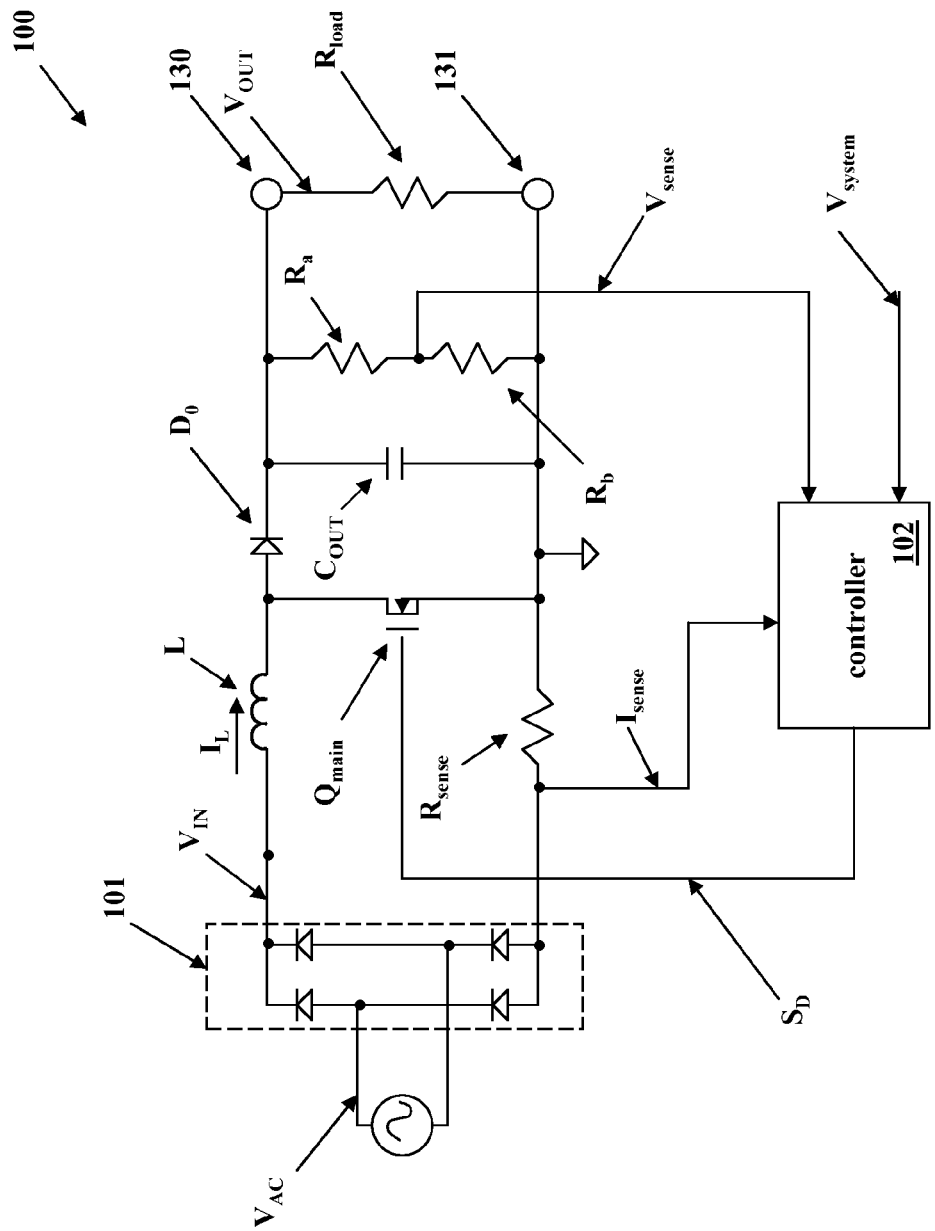
FIG. 1 illustrates a schematic drawing of a boost power train and a controller of a power converter to illustrate the operation thereof, constructed according to an embodiment.

Referring initially to FIG. 1, illustrated is a schematic drawing of an embodiment of a boost power train 100 of a switched-mode power converter coupled to a rectified ac input line to illustrate the operation thereof. The power converter includes a controller 102 that regulates a power converter output characteristic such as an output voltage. The power converter provides power to a system/load represented by the resistor $R_{load}$ coupled to output terminals 130 and 131. While in the illustrated embodiment the power train employs a boost converter topology, those skilled in the art should understand that other converter topologies such as an isolated boost topology are well within the broad scope of the present invention.

The power train of the power converter receives a rectified input voltage $V_{IN}$ from a source of electrical power at an input thereof and provides a regulated output voltage $V_{OUT}$ or other output characteristic at output terminals 130 and 131. The rectified input voltage $V_{IN}$ as illustrated in FIG. 1 may be produced from an ac line input voltage $V_{AC}$ employing a bridge rectifier arrangement such as bridge rectifier 101. In keeping with the principles of a boost converter topology, the output voltage $V_{OUT}$ is generally higher than the input voltage $V_{IN}$ such that a switching operation of the power converter can regulate the output voltage $V_{OUT}$.

During a first portion D of a high-frequency switching cycle, the power switch $Q_{main}$ is enabled to conduct in response to a gate drive signal $S_D$ for a primary interval, coupling the input voltage $V_{IN}$ to a boost inductor L. During the first portion D of the switching cycle, an inductor current $I_L$ flowing through the input filter inductor L increases.

During a second portion 1-D of the switching cycle, the power switch $Q_{main}$ is transitioned to a non-conducting state, and an auxiliary power switch $D_0$ (e.g., a diode) is enabled to conduct. The auxiliary power switch $D_0$ provides a path to maintain continuity of inductor current $I_L$ flowing through the boost inductor L. During the second portion 1-D of the switching cycle, the inductor current $I_L$ flowing through the boost inductor L decreases. In general, the duty cycle of the power switch $Q_{main}$ may be adjusted to regulate the output voltage $V_{out}$ of the power converter.

The controller 102 of the power converter senses the output voltage $V_{OUT}$ of the power converter and a desired output characteristic such as a desired system voltage $V_{system}$. In addition, the controller 102 receives a signal $I_{sense}$ from a current sensing device such as the resistor $R_{sense}$ that senses a current in the boost inductor L. The current sensing device can also be constructed with a current sensing transformer using techniques well known in the art. The controller 102 controls conductivity of the power switch $Q_{main}$ with a duty cycle D. In a switched-mode power converter, such as the boost power converter illustrated and described with reference to FIG. 1, the duty cycle D of the power switch $Q_{main}$ determines the steady-state ratio of a power converter output voltage $V_{OUT}$ to its input voltage $V_{in}$.

A number of design approaches are conventionally known to implement a PFC controller for a power converter. One approach, originally described by B. L. Wilkinson, et al., in U.S. Pat. No. 4,677,366, entitled "Unity Power Factor Power Supply" ("Wilkinson"), operates in continuous conduction mode ("CCM") and employs three pins to sense input voltage; input current; and output voltage. An integrated circuit related to Wilkinson is described by Philip C. Todd in Texas Instruments' Application Note U-134 entitled "UC3854 Controlled Power Factor Correction Circuit Design," dated 1999.

Figure 2:
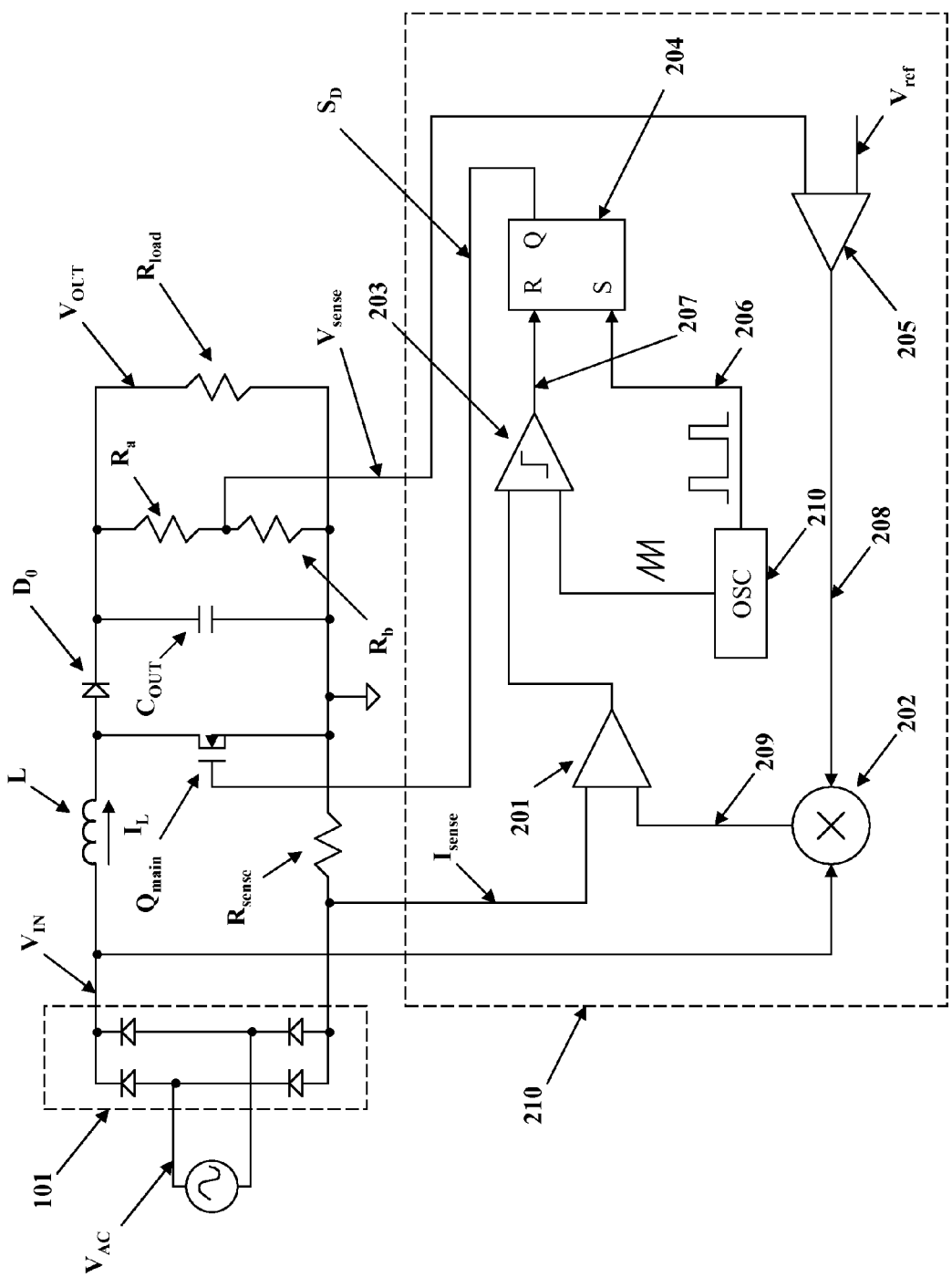
FIGS. 2 to 5 illustrate schematic drawings of conventional PFC control processes.

Turning now to FIG. 2, illustrated is a block diagram of a PFC control process as described by Wilkinson. Wilkinson includes two regulation loops, an outer output voltage loop and an inner input current loop. An operational amplifier 205 is employed to compare sensed output voltage $V_{sense}$ from the power converter with a reference voltage $V_{ref}$ to produce an error amplifier signal 208. The error amplifier signal is multiplied by the rectified input voltage $V_{IN}$ to the power converter by multiplier 202 to produce a control signal 209 that is compared with an input current signal $I_{sense}$ by operational amplifier 201. Oscillator 210 produces a sawtooth waveform that is coupled to comparator 203 to produce a reset signal for RS flip-flop 204. Oscillator 210 also produces a pulse waveform to set RS flip-flop 204. The RS flip-flop 204 produces the control signal $S_D$ to control the conductivity of power switch $Q_{main}$. The controller thereby regulates the input current waveform to be sinusoidal and in phase with the input rectified line voltage. Wilkinson produces an input current that reasonably accurately follows input voltage waveform under a wide range of load and input voltage operating conditions, and has been widely applied over the years in many power factor correction applications.

Thus, three pins are required by Wilkinson for sensing functions for a power converter operating in CCM, and further pins are required for error amplifier compensation, etc., requiring at least six pins and a substantial number of external components that operate in conjunction with these pins.

Another approach utilizes two sensing pins to provide power factor correction, as described by J. Hwang, et al., in the paper entitled "New Universal Control Methods for Power Factor Correction and DC to DC Converter Applications," IEEE Applied Power Electronics Conference, Vol. 1, Feb. 23, 1997, pp. 59-65, ("Hwang").

In the method of Hwang, assuming a stable voltage feedback loop and constant output voltage, the off duty cycle, $D_{OFF}$, for a CCM PFC system is given by equation (1), which is a practical approximation but does not account for certain power losses within the power converter:

$$D_{OFF} = \frac{V_{IN}}{V_{OUT}}. \quad (1)$$

From equation (1), the off duty cycle $D_{OFF}$ is proportional to the rectified input voltage $V_{IN}$. The current loop regulates average inductor current to be proportional to the off duty cycle $D_{OFF}$, and thus proportional to the rectified input voltage $V_{IN}$. One sensing pin is employed to sense output voltage, and another to sense input current.

Advantages of Hwang include the use of only two sensing pins, plus a pin for feedback compensation. Thus, fewer pins are employed by Hwang for PFC regulation. Since only two pins are employed for sensing, fewer external components are needed for regulation. Nonetheless, regulation of the input current waveform depends on equation (1), which, as indicated above, does not account for certain power losses within the power converter, and accordingly results in less precise regulation than provided by Wilkinson. Hwang for a power converter operating in CCM generally does not produce an accurate input current waveform when the input voltage is low, or when there is a light output current to the load.

Qiu, D.-Y., et al., in the paper entitled, "Single Current Sensor Control for Single-Phase Active Power Factor Correction,", IEEE Transactions on Power Electronics, September, 2002, Vol. 17, Issue: 5, pp. 623-632, ("Qiu"), introduced a third method that employs only one sensing pin for PFC control.

Figure 3:
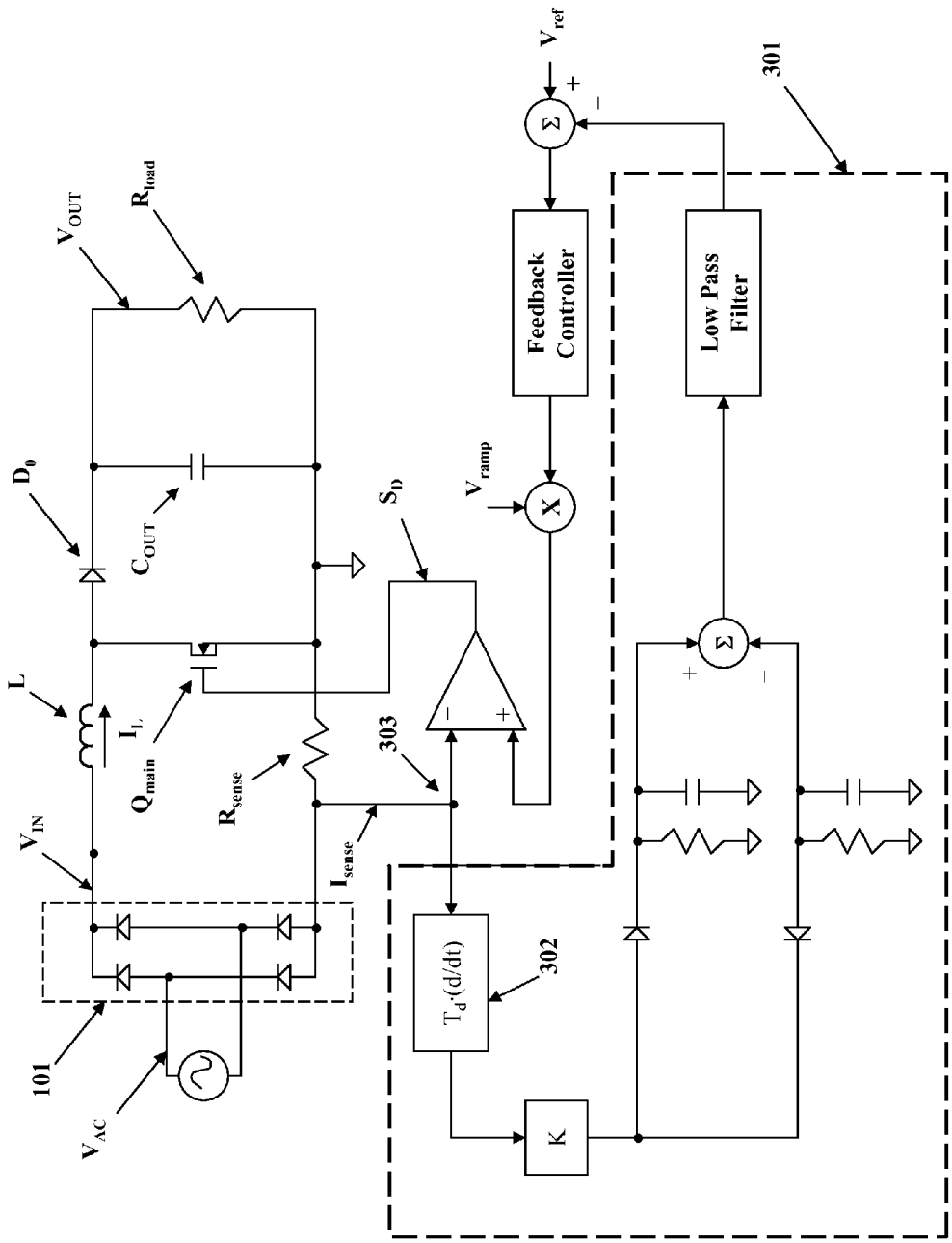

A block diagram illustrating the PFC control technique of Qiu is shown in FIG. 3, illustrating a PFC controller 301. As shown by the block diagram, only one sensing pin is required for PFC control, i.e., for directly sensing input current. During the on period of the power switch $Q_{main}$, current through inductor L is related to the input voltage $V_{IN}$ to the power converter and to the inductance of the boost inductor L by equation (2):

$$V_{IN} = L\frac{di_L}{dt}. \quad (2)$$

During the off period of the power switch, current through inductor L is related to the input voltage $V_{IN}$ and the output voltage $V_{OUT}$ of the power converter by equation (3):

$$V_{OUT} - V_{IN} = L\frac{di_L}{dt}. \quad (3)$$

By using differential circuit 302 to calculate the slew rate of $i_L$ (i.e., the time derivative of the input current), the input voltage $V_{IN}$ and output voltage $V_{OUT}$ can be estimated employing equations (2) and (3).

Since the input voltage $V_{IN}$ and output voltage $V_{OUT}$ can be estimated knowing $i_L$, traditional PFC control approaches, such as one based on the process described by Wilkinson, can be employed to regulate the waveform of the input current to follow the waveform of the input voltage, while regulating the output voltage. Thus, only one sensing pin 303 is required by Qiu for the PFC control function. To provide an accurate level of input and output voltage sensing that would be required in a practical circuit implementation, two additional pins would generally be required.

Despite the need for input and output voltage sensing pins in a practical circuit implementation, Qiu cannot be easily implemented in an analog integrated circuit, because a differential circuit is not easily implemented due to loose analog component tolerances. In addition, the inductance of the external boost inductor L is generally unknown to the controller, resulting in an inaccurate estimate of the output voltage. Also, Qiu, particularly for a power converter operating in CCM, cannot be easily implemented in a digital integrated circuit, due to the high sampling rate necessary for an analog-to-digital converter that is required to calculate the slew rate of the input current, which affects the accuracy of the estimate of the output voltage.

Figure 4:
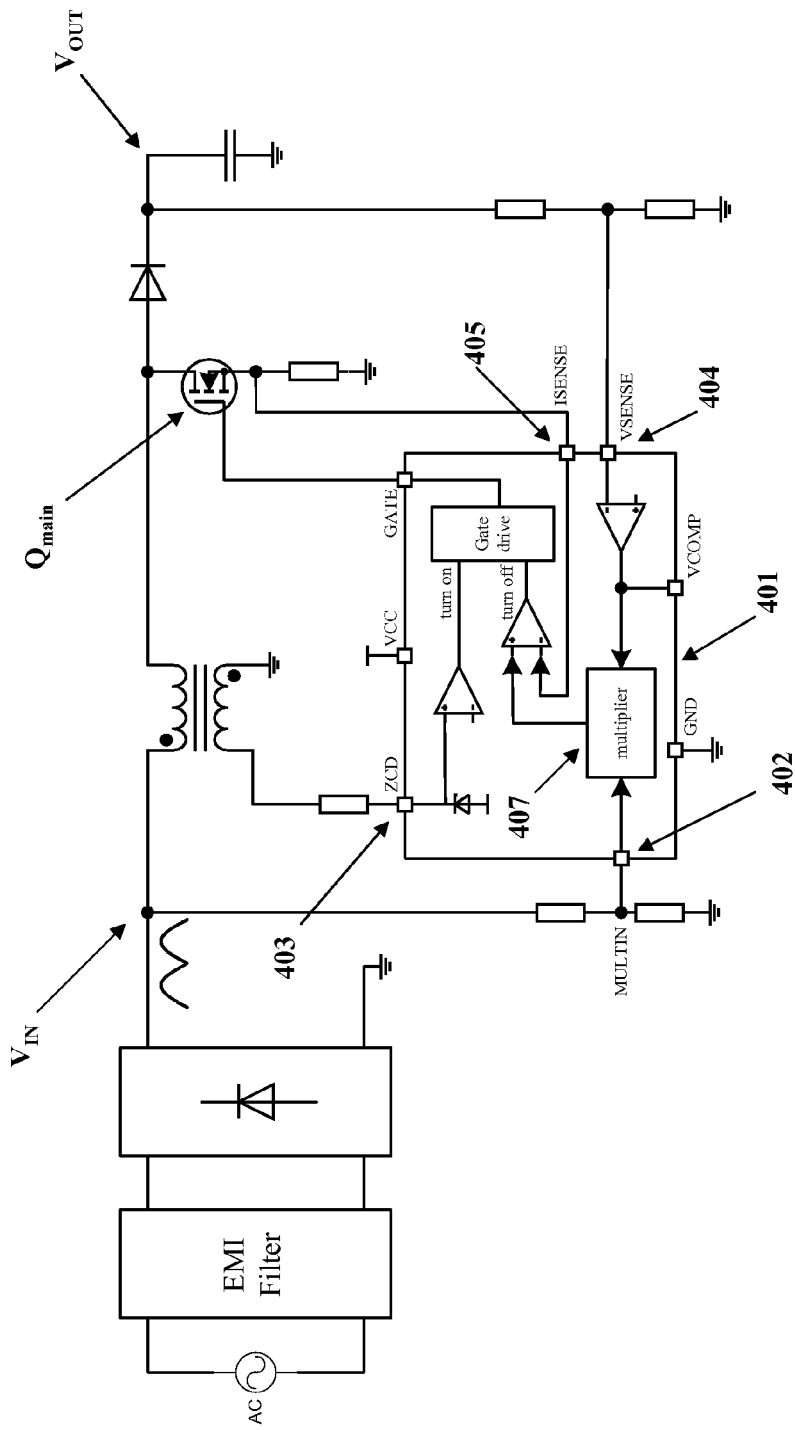

Turning now to FIG. 4, illustrated is a schematic drawing illustrating a further conventional PFC controller 401 employing a multiplier 407 and multiple sensing pins 402, 403, 404, and 405. The peak inductor current of a boost converter is controlled to track the sinusoidal waveform of input voltage to achieve high power factor. This control method senses the input voltage $V_{IN}$ at the input of multiplier 407 and compares the output of the multiplier with the sensed inductor current at circuit node 405 to turn off the power switch $Q_{main}$. This PFC control approach has been employed in an 8-pin IC in the Infineon TDA4863, the STM L6561, the ONSEMI MC33232, and the Texas Instruments UCC38050 controllers. Although the input voltage $V_{IN}$ is sensed at the input of a multiplier, this signal is not used in these integrated circuits to realize a brownout protection function that is generally necessary in a practical power converter design. Another disadvantage of these integrated circuits, particularly for a power converter operating in CCM, is the high cost of the multiplier due to the requirement for high multiplication linearity and low operational amplifier offset voltages.

Figure 5:
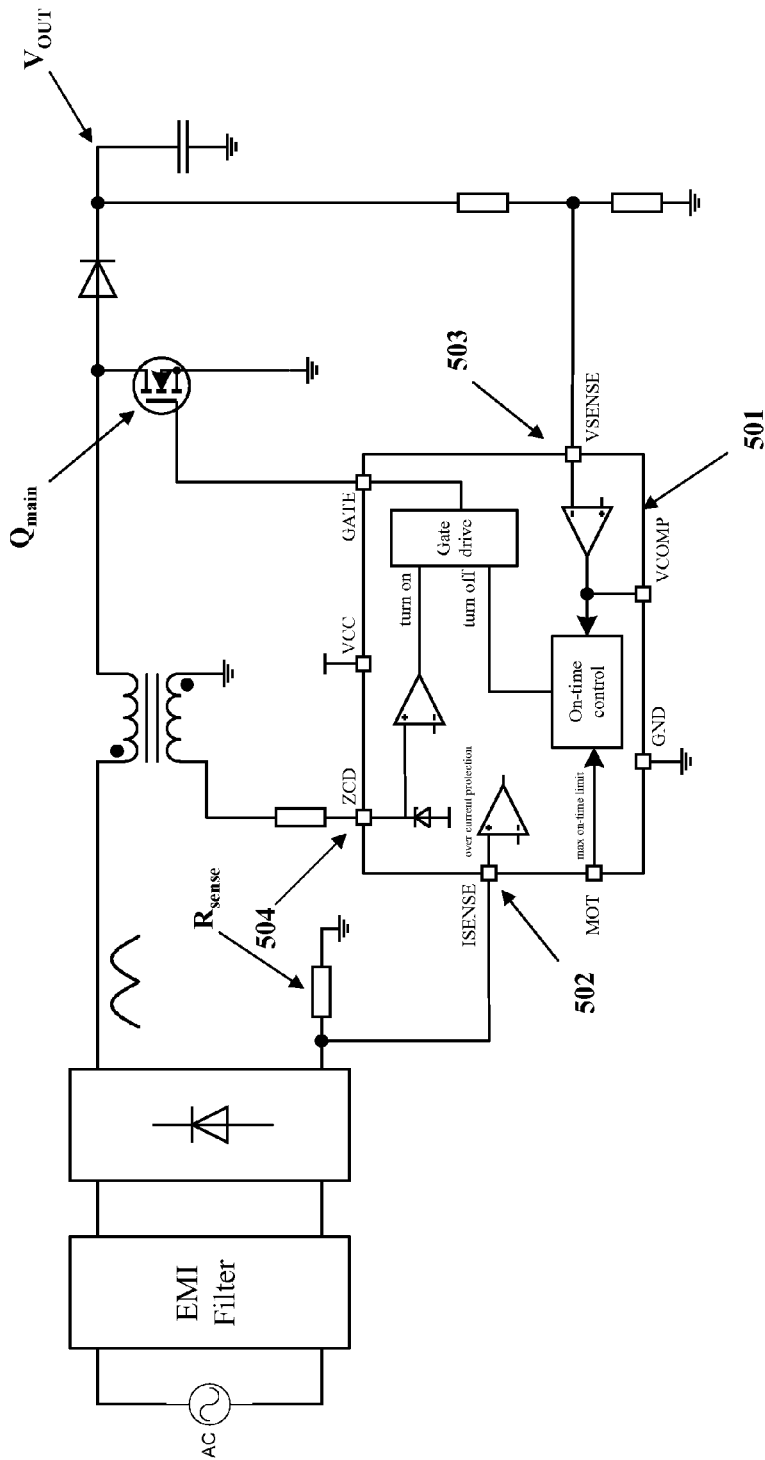

Turning now to FIG. 5, illustrated is a schematic drawing of a constant on-time PFC controller 501 representative of ONSEMI NCP1606 and Fairchild FAN7528 controllers. These controllers eliminate the need for a multiplier but still retain the need for multiple sensing pins, such as sensing pins 502, 503, and 504. The conduction time of the switch $Q_{main}$ is kept constant during a switching period in a stable operating condition, which controls the waveform of the average input current to track the waveform of the input voltage to produce high power factor. The disadvantage of this approach, particularly for a power converter operating in critical conduction mode, is that there is no spare pin to sense input voltage in an 8-pin package. As a result, the controller 501 does not provide the brownout protection function that is often required by system designers.

Further approaches to controller design are described in U.S. Pat. Nos. 5,757,635 and 5,798,635, which are hereby referenced and incorporated herein.

A new approach to providing power factor correction by sensing a voltage across a boost inductor L is introduced herein that employs only one sensing pin for a power factor correction control function that accommodates accurate sensing of input and output voltages, and for estimating an input current waveform. The sensing of input and output voltages and the waveform of the input current are insensitive to the inductance of the boost inductor L.

Figure 6:
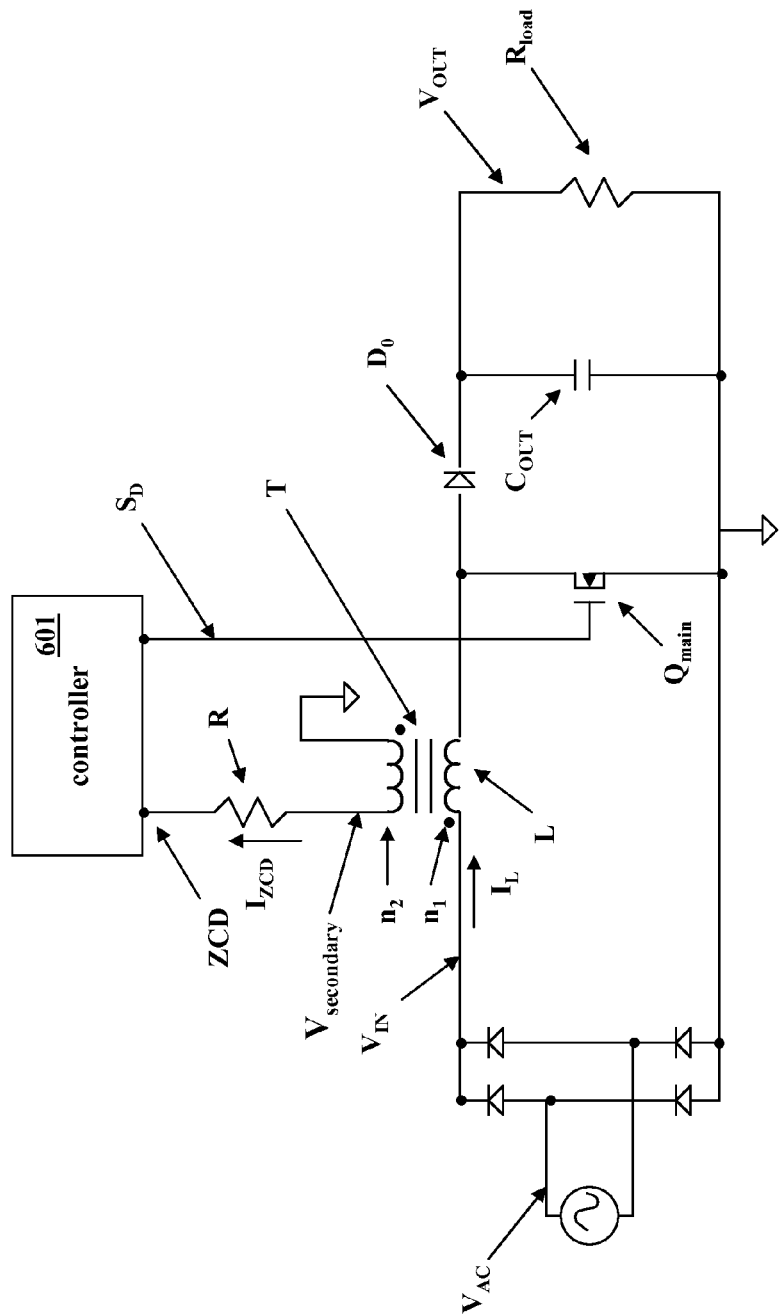
FIG. 6 illustrates a schematic drawing showing a PFC control approach that advantageously employs one sensing pin, constructed according to an embodiment.
Figure 7:
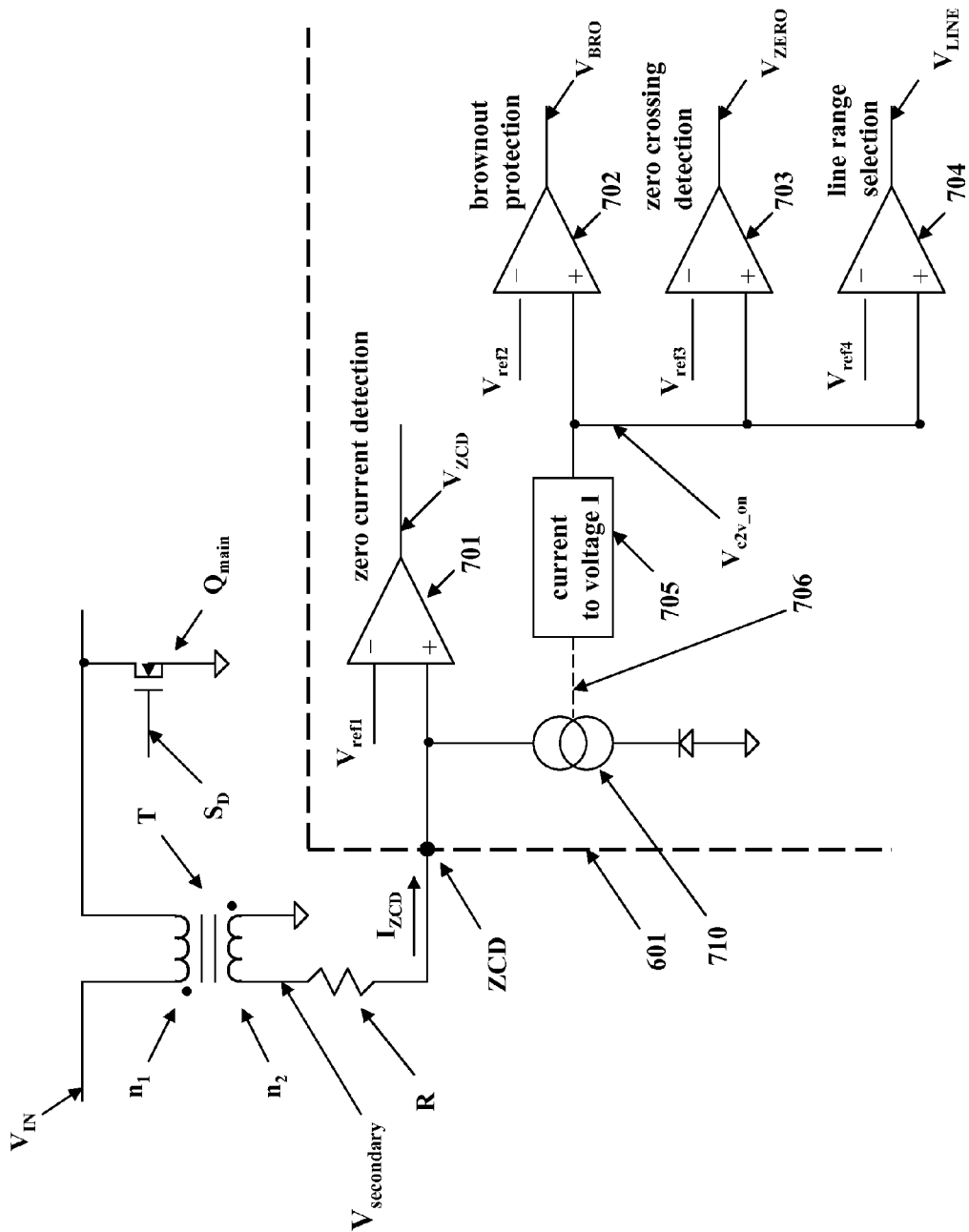
FIG. 7 illustrates a schematic drawing showing further structure of the PFC controller illustrated in FIG. 6, constructed according to an embodiment.

Turning now to FIG. 6, illustrated is a schematic drawing showing an embodiment of the new PFC control approach that advantageously employs one sensing pin, ZCD, and in FIG. 7, illustrated is a schematic drawing showing an embodiment of further structure of the controller 601 illustrated in FIG. 6. One function of the pin ZCD is to generate a turn-on signal for the power switch $Q_{main}$ by sensing the falling edge of the input voltage coupled to this pin, and comparing this falling voltage to a reference voltage $V_{ref1}$, as illustrated in FIG. 7. It may thus detect the input voltage when it is below a certain voltage. The power switch $Q_{main}$ is maintained in the on state for a time interval that is controlled by the controller 601. The on time interval for the power switch $Q_{main}$ may be adjusted by the controller to control the power level of the power converter, as described below. Typically the on time interval is of the order of several microseconds. A second function of the pin ZCD is to monitor the amplitude of the rectified ac input voltage $V_{IN}$ to the power converter by sensing the current $I_{ZCD}$ flowing into or out of this pin. When the power switch $Q_{main}$ is turned on, the voltage $V_{secondary}$ is negative, i.e., flows out of the pin ZCD, and is proportional to the rectified ac input voltage $V_{IN}$. The voltage of the pin ZCD is clamped or otherwise constrained to be a small voltage. Therefore the rectified input voltage $V_{IN}$ is effectively monitored because the sensed current $I_{ZCD}$ is proportional to the input voltage during the conduction time of the power switch $Q_{main}$. The process advantageously accommodates accurate monitoring of the input voltage $V_{IN}$ during the on time of the power switch $Q_{main}$. A third function of the pin ZCD is to monitor the output voltage of the power converter, as described later hereinbelow. Monitoring of input voltage and output voltage of the power converter as introduced herein can be performed in CCM and in critical conduction mode ("CRM"). Critical conduction mode refers to operating the power converter on the boundary between discontinuous and continuous conduction modes. A fourth function of the pin ZCD is to emulate an input current signal that is used for CCM PFC operation.

A PFC controller for a boost power converter can be designed without a multiplier by operating the power converter in CRM, for example, as described in On Semiconductor Application Note entitled "NCP1606 Cost Effective Power Factor Controller," dated November 2007, Rev. 5. The power switch, such as the power switch $Q_{main}$, is turned on for a period of time that may be controlled by an error amplifier in the controller to control a power level of the power converter, and is turned off when current in the boost inductor reaches zero. The resulting high-frequency waveform of the current $I_L$ flowing through the boost inductor is triangular, but its low-frequency waveform after low-pass filtering substantially replicates the waveform of the input voltage $V_{IN}$, i.e., the waveform of the current has the same shape as the waveform of the input voltage, but differs by a scale factor.

The zero current level in the boost inductor is detected by observing a drop in a voltage of a terminal of the boost diode, for example a drop in the anode voltage of the boost diode $D_0$ illustrated in FIG. 6. Thus the turn on of the main power switch is determined by falling edge of ZCD pin. The time for turn-on of the power switch $Q_{main}$ is dependent on the instantaneous level of the anode voltage of the boost diode.

Turning now to FIG. 7, illustrated is a schematic drawing showing a secondary winding of the transformer T coupled through the resistor R to the pin is ZCD and to circuit elements in controller 601. A drop of the anode voltage of the boost diode is detected by comparator 701 to initiate turn-on of the power switch $Q_{main}$. Thus the turn on of the main power switch is determined by falling edge of ZCD pin. Comparator 701 may be designed with hysteresis for the voltage detection function using techniques well known in the art.

The current source 710 senses and repeats the current flowing $I_{ZCD}$ into the pin ZCD. The current $I_{ZCD}$ is first converted to a "turn-on current" $I_{in\_on}$ 706 by current source 710 that is converted by current-to-voltage converter block 705 to a voltage $V_{c2v\_on}$. Current-to-voltage converter block 705 performs the conversion only during the on period of the power switch $Q_{main}$. The current $I_{ZCD}$ is also converted to a "turn-off current" $I_{in\_off}$ during the off period of the power switch $Q_{main}$ for use as described below. The voltage $V_{c2v\_on}$ is compared to reference voltages $V_{ref2}$, $V_{ref3}$, and $V_{ref4}$ in comparators 702, 703, and 704, respectively, to produce comparator output signals $V_{BRO}$, $V_{ZERO}$, and $V_{LINE}$, representing, respectively, a brownout protection signal, a power converter input voltage zero-crossing detection signal, and a line range selection signal.

Figure 8:
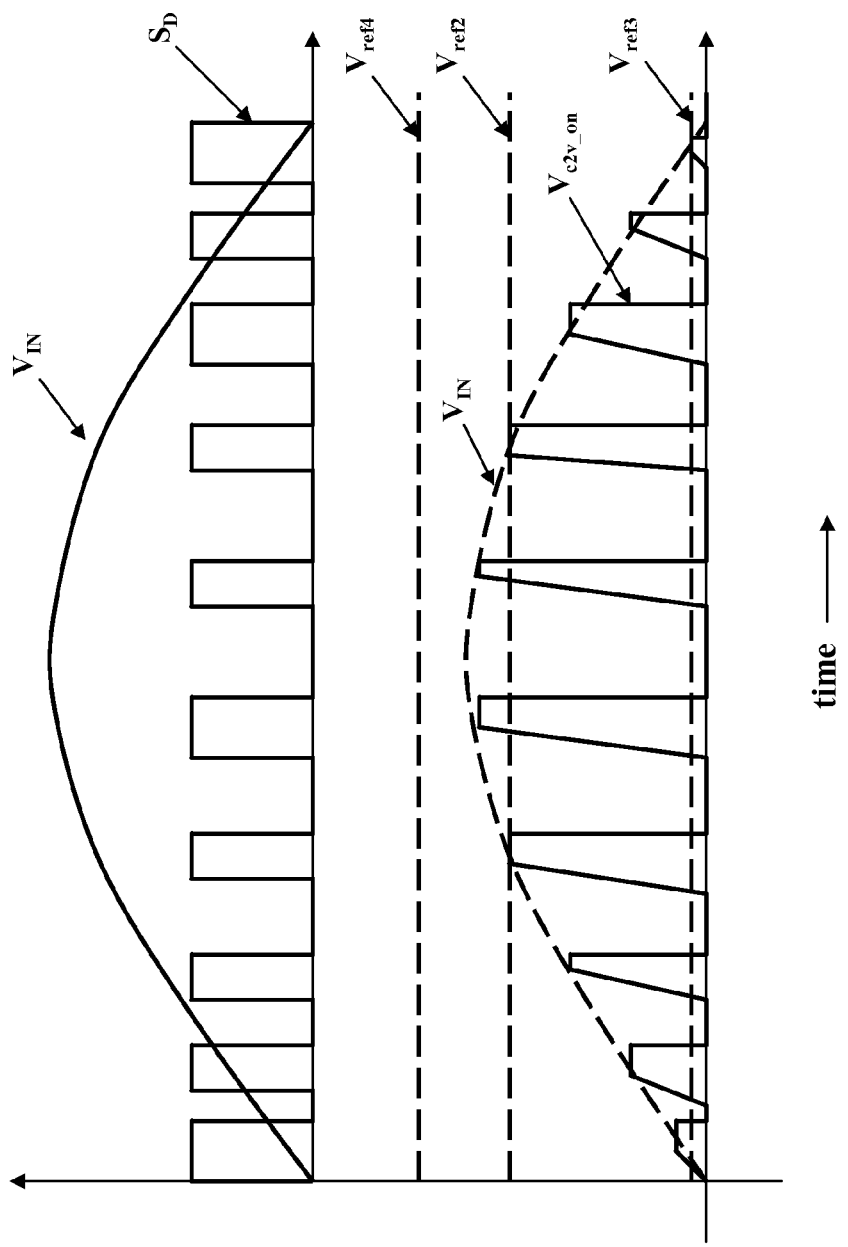
FIG. 8 illustrates waveforms associated with the circuit illustrated in FIGS. 6 and 7.

Turning now to FIG. 8, illustrated are waveforms associated with the circuit illustrated in FIGS. 6 and 7. The sensed current $I_{ZCD}$ is converted to a voltage pulse signal $V_{c2v\_on}$ whose amplitude is proportional to the rectified input voltage $V_{IN}$. FIG. 8 illustrates that $V_{c2v\_on}$ is always lower than $V_{ref3}$ near the zero-crossing area of the ac input voltage to the power converter, and the output of comparator 703 is asserted low, thereby providing a signal $V_{ZERO}$ to the controller 601 to modify the control process that controls the duty cycle D, i.e., the conduction time, of the power switch $Q_{main}$, which can advantageously reduce current distortion of the ac input current to the power converter.

The signal $V_{c2v\_on}$ is also employed to detect a brownout condition of the ac input voltage to the power converter. If the amplitude of the voltage $V_{c2v}$ is insufficient to reach the voltage $V_{ref2}$ over the course of one rectified ac cycle as indicated by comparator 702 not asserting its output voltage $V_{BRO}$ high, the gate drive signal $S_D$ is turned off for brownout protection. Brownout protection would typically be set for an RMS input voltage to the power converter less than 85 V. Normal operation does not resume until the peak voltage of $V_{c2v\_on}$ is higher than $V_{ref2}$. Hysteresis may be included in the process for detecting a brownout condition, using hysteresis techniques well known in the art.

The ac line voltage input range is sensed by comparator 704. For example, if the voltage $V_{ref4}$ is higher than $V_{c2v\_on}$ substantially through one rectified ac cycle, a low line range selection signal $V_{LINE}$ is produced at the output of comparator 704, i.e., if the RMS ac input voltage range to the power converter is, for example, in the low voltage range of 85 V to 165 V ac. Conversely, a high line input range signal is produced at the output of comparator 704 voltage $V_{ref4}$ is higher than $V_{c2v\_on}$, i.e., if the RMS ac input ac input voltage range to the power converter is, for example, in the high voltage range of 180 V to 265 V ac.

Figure 9:
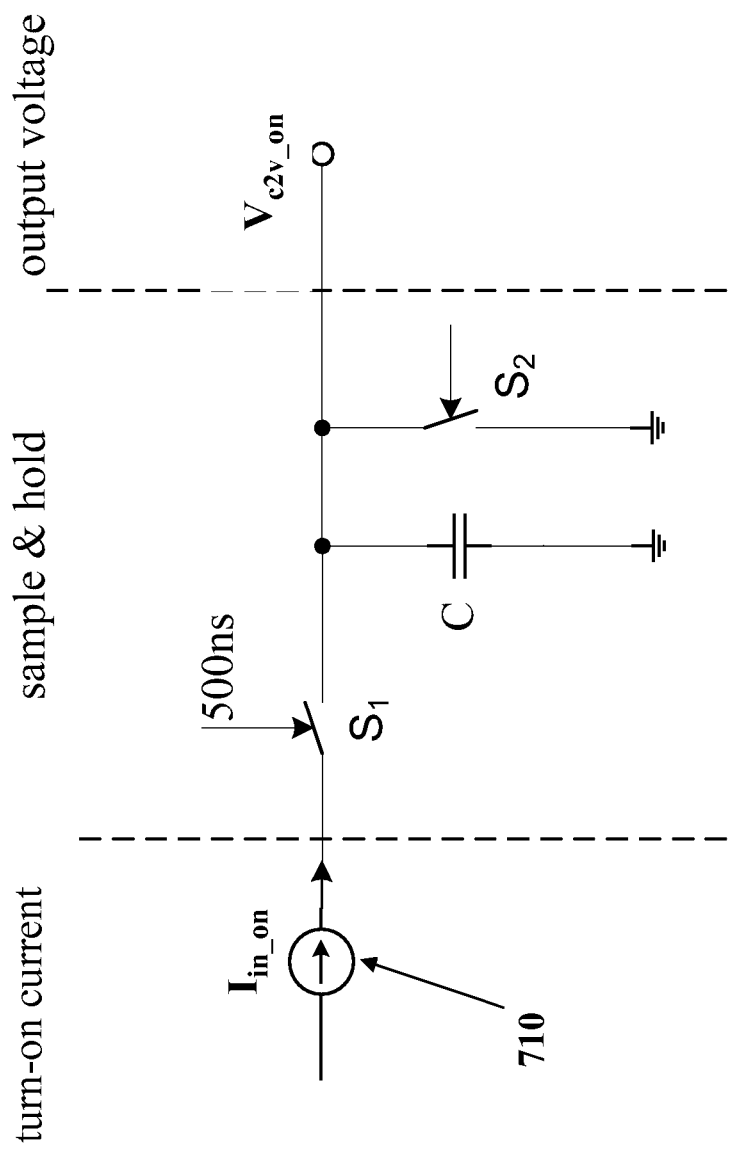
FIG. 9 illustrates an embodiment of the current-to-voltage conversion block shown in FIG. 7, constructed according to an embodiment.

An embodiment of the current-to-voltage conversion block 705 shown in FIG. 7 is illustrated in FIG. 9. When the gate drive signal $S_D$ is high, the switch $S_1$ is turned on, for example for 500 ns, and the input current 706 charges the capacitor C. Then the output voltage $V_{c2v\_on}$ is held by the charge in capacitor C and compared with the three reference voltages $V_{ref2}$, $V_{ref3}$, and $V_{ref4}$ in comparators 702, 703, and 704. When the gate drive signal $S_D$ is low, the switch $S_2$ is turned on and the capacitor C is discharged to zero. The conversion is repeated for each switching cycle. An advantage of this current-to-voltage conversion method is its high conversion accuracy, because the voltage $V_{c2v\_on}$ is produced without relying on internal resistors.

The current $I_{ZCD}$ is thus converted into a voltage signal during the on time of the power switch $Q_{main}$, which can be advantageously employed for brownout protection, current distortion reduction, and improved control-loop performance without the need for an additional sensing pin for these functions.

The process introduced herein of employing one pin for multifunctional use can be extended to output voltage sensing and zero current detection so that a PFC controller can also provide the functions of output overvoltage and undervoltage protection.

An output overvoltage protection process is conventionally implemented using a comparator in a voltage feedback loop with an input signal coupled to an output terminal of the power converter. The comparator input signal could be a current or a voltage signal depending on the construction of the error amplifier in the feedback loop. The overvoltage protection comparator typically uses a voltage sense signal that is proportional to the power converter output voltage produced by an external resistor divider. Once the voltage-sense signal is higher than a reference voltage level, the overvoltage protection comparator asserts a fault signal to disable conduction of a power switch, such as the power switch $Q_{main}$. The Infineon ICExPCS0x, Fairchild FAN7530 and Fuji FA5500 controllers have employed this output overvoltage protection approach in conventional designs.

Another output overvoltage protection approach compares a feedback current with a reference overvoltage protection level using a current comparator. The feedback current is proportional to the variation of the power converter output voltage. Therefore an output overvoltage protection comparator will output a fault signal when a sensed current is higher than a threshold current protection level. The Infineon TDA4863, STM L6561 and ONSEMI NCP1606 controllers have employed this output overvoltage protection approach in conventional designs.

A disadvantage of these output overvoltage protection approaches is that an overvoltage protection threshold depends on a resistance ratio in a resistor divider. If there is an unanticipated resistance increase in the upper resistor of the resistor divider, or if there is an unanticipated resistance decrease in the lower resistor of the resistor divider, the power converter output voltage will be correspondingly regulated at a higher voltage level, with a corresponding change in the output overvoltage protection function, possibly damaging components of the power converter or the load. Thus, a redundant output overvoltage protection arrangement is generally employed by power supply designers. Usually an additional output overvoltage protection pin is required to be coupled to another resistor divider coupled to an output voltage of the power converter. A disadvantage of a redundant output overvoltage protection arrangement is the need for a further pin in the controller package, which is generally not possible in a stand-alone, eight-pin PFC controller arrangement.

Figure 10:
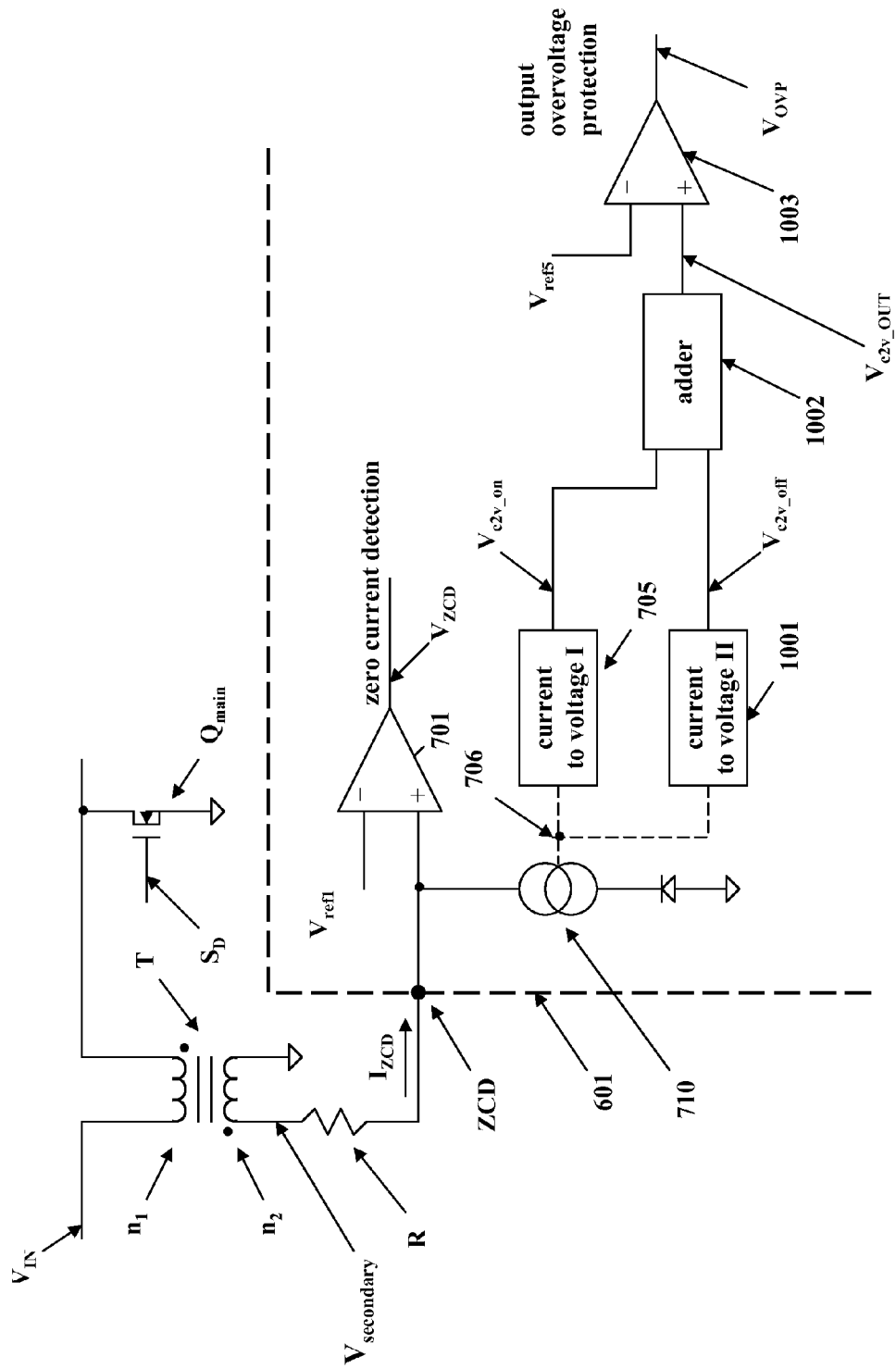
FIG. 10 illustrates a schematic drawing showing further structure of the controller 601 illustrated in FIG. 6 to provide output overvoltage protection, constructed according to an embodiment.

Turning now to FIG. 10, illustrated is a schematic drawing showing embodiment of further structure of the controller 601 illustrated in FIG. 6 to provide output overvoltage protection. As described previously hereinabove, a function provided by the pin ZCD is to enable generation of a turn-on signal $S_D$ for the power switch $Q_{main}$ in response to sensing a falling edge of current at the pin ZCD and to compare a signal proportional to the input voltage $V_{IN}$ to the power converter to a reference signal $V_{ref1}$ to terminate the duty cycle of the power switch $Q_{main}$.

The third function enabled by the pin ZCD as introduced herein is monitoring of the power converter output voltage by sensing current flowing through this pin. When the power switch $Q_{main}$ is turned on, the voltage $V_{secondary}$ is negative and proportional to the magnitude of the rectified ac input voltage $V_{IN}$. At this time the pin ZCD is constrained to be a small voltage near zero. Therefore, the current $I_{ZCD}$ flowing out of the pin ZCD is proportional to the input voltage $V_{IN}$ during conduction time of the power switch $Q_{main}$. When the power switch $Q_{main}$ is turned off, the voltage $V_{secondary}$ is positive and proportional to $V_{OUT}-V_{IN}$. At this time the voltage of the pin ZCD is constrained to be a small positive voltage. Accordingly, the current $I_{ZCD}$ is substantially proportional to $V_{OUT}-V_{IN}$ during the off time of the power switch $Q_{main}$. As stated above, the current source 710 senses and repeats the current $I_{ZCD}$ flowing into the pin ZCD.

The current $I_{ZCD}$ is converted to the voltage pulse signal $V_{c2v\_on}$ during the on time of the power switch $Q_{main}$, and to the voltage pulse signal $V_{c2v\_off}$ during the off time of the power switch $Q_{main}$. These signals are added together to form a voltage signal $V_{c2v\_OUT}$ proportional to the power converter output voltage $V_{OUT}$.

Figure 11:
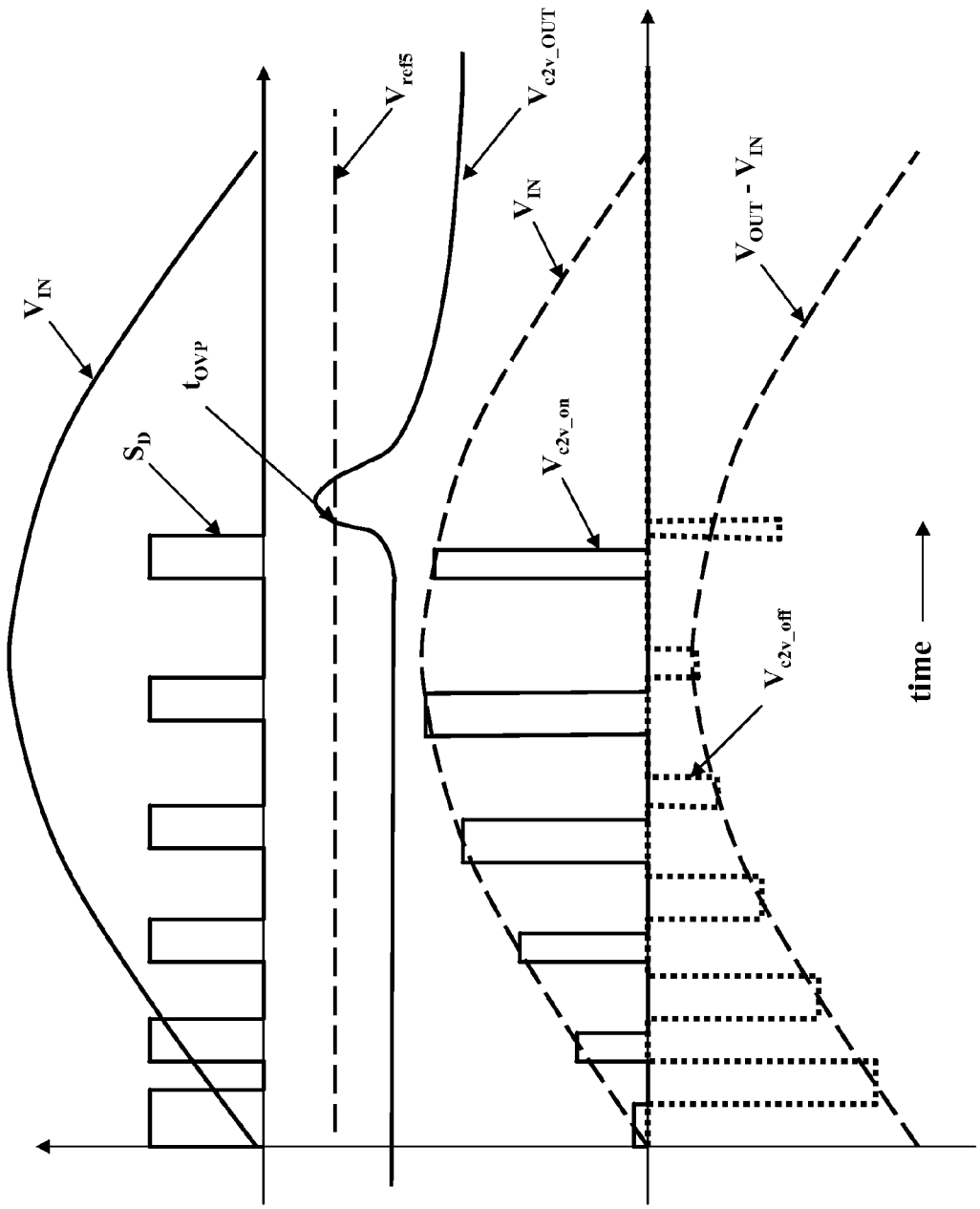
FIG. 11 illustrates a graphical drawing showing waveforms associated with the circuits illustrated in FIGS. 6, 7, and 10.

Turning now to FIG. 11, and with continuing reference to FIGS. 7 and 10, illustrated is a graphical drawing showing that when the voltage $V_{c2v\_OUT}$ is higher than the reference voltage $V_{ref5}$ at a time $t_{OVP}$, the overvoltage protection comparator 1003 illustrated in FIG. 10 generates a fault signal $V_{OVP}$ to latch off the gate drive signal $S_D$ for the power switch $Q_{main}$ until the controller 601 is restarted. As illustrated in FIG. 10, the current signal $I_{ZCD}$ is converted to a voltage pulse signal $V_{c2v\_on}$ whose amplitude is proportional to the input voltage $V_{IN}$ during the on time of the power switch $Q_{main}$, and to a voltage pulse signal $V_{c2v\_off}$ whose amplitude is proportional to $V_{OUT}-V_{IN}$ during the off time of the power switch $Q_{main}$. If the signal $V_{c2v\_OUT}$ is higher than the voltage reference $V_{ref5}$, then the output of comparator 1003 is asserted high, which provides a signal to the controller 601 that the output voltage of the power converter exceeds an output overvoltage protection level. In response, the gate drive signal $S_D$ is disabled.

Figure 12:
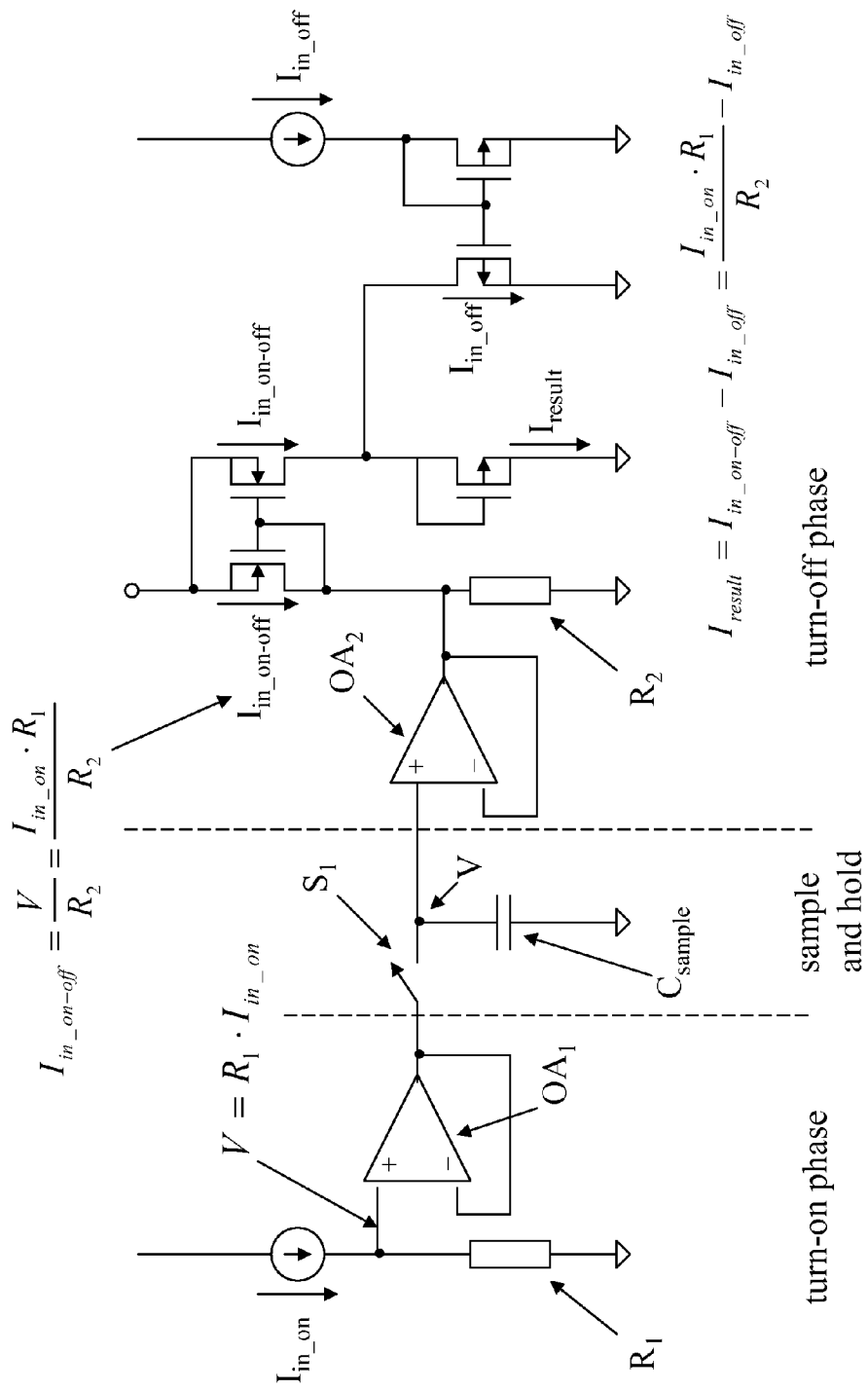
FIG. 12 illustrates a representative circuit performing a current sense calculation, constructed according to an embodiment.

Turning now to FIG. 12, illustrated is an embodiment of current sensing and calculation of a current $I_{result}$ flowing into the pin ZCD that is related to the output voltage of the power converter $V_{OUT}$. The currents $I_{in\_on}$ and $I_{in\_off}$ illustrated in FIG. 12 are, respectively, the currents $I_{ZCD}$ flowing through the pin ZCD during the on and off phases of the power switch $Q_{main}$. Shortly after the gate drive signal $S_D$ is high, the switch $S_1$ is turned on, and the voltage across the capacitor $C_{sample}$ is set to the voltage $I_{in\_on} \cdot R_1$ that is proportional to the input voltage $V_{IN}$. Operational amplifier $OA_1$ is formed as a voltage follower to prevent current loading of the resistor $R_1$. Before the gate drive signal $S_D$ is low, the switch $S_1$ is turned off and the sampled voltage across the capacitor $C_{sample}$ is held to provide a voltage proportional to the input voltage $V_{IN}$. Operational amplifier $OA_2$ is also formed as a voltage follower to prevent loading of the capacitor $C_{sample}$. The output current $I_{result}$ is calculated by subtracting $I_{in\_off}$ proportional to $V_{OUT}-V_{IN}$ from $I_{in\_on-off}$. If resistance of resistor $R_1$ is equal to the resistance of resistor $R_2$, the current $I_{result}$ is proportional to $V_{OUT}$, as indicated by the analysis described later hereinbelow.

Thus, the circuit illustrated in FIG. 12 provides means for time alignment of current flowing into the pin ZCD during on and off phases of the power switch $Q_{main}$ to provide an estimate of the power converter output voltage. The current $I_{result}$ can be compared with a current reference to provide output overvoltage protection, or can be incorporated into a process to provide power factor correction. An advantage of this process, again, is high conversion accuracy because tolerances due to variations in the resistances of resistors $R_1$ and $R_2$ are minimized by using the same resistance type, which can be matched.

As described above, a current derived from voltages impressed across a boost inductor is resolved into two voltage signals that are added. A calculated voltage signal is compared with an internal voltage reference. Alternatively, a current signal is sampled and held shortly after turn-on of a power switch, and then a current signal shortly after turn-off of the power switch is subtracted from the sampled and held signal to produce a current signal proportional to the output voltage of the power converter. As a result, a controller can provide redundant output overvoltage protection and output voltage regulation without the need for an additional voltage-sensing pin, which enables a PFC controller to be economically formed in an eight-pin package.

The circuits illustrated in FIGS. 6, 7, and 10 can be analyzed as follows. During the "on" phase of the power switch $Q_{main}$, the voltage across the inductor L is $V_{IN}$, and during the "off" phase of the power switch $Q_{main}$, the reverse voltage across the inductor L is $V_{IN}-V_{OUT}$. The inductor L represents the magnetizing inductance of the primary winding $n_1$ of transformer T illustrated in FIG. 6. More accurately, the reverse voltage across the inductor L is $V_{IN}-0.7-V_{OUT}$, due to the boost diode $D_0$. Because the quantity 0.7 V is generally small compared to the output voltage $V_{OUT}$, it can often be omitted practically. Through the transformer T, the voltage across the inductor L is converted into another voltage $V_{secondary}$. During the "on" phase of the power switch $Q_{main}$, the voltage $V_{secondary}$ is $$V_{secondary} = -\frac{V_{IN} \times n_2}{n_1}, \quad (4)$$

where the number of turns $n_1$ and $n_2$ of the windings of transformer T are identified in FIGS. 6, 7, and 10. Accordingly, the ratio $n_2/n_1$ is the secondary-to-primary turns ratio of the transformer T.

During the "off" phase of the power switch $Q_{main}$, the voltage $V_{secondary}$ is $$V_{secondary} = -\frac{(V_{IN}-V_{OUT}) \times n_2}{n_1}. \quad (5)$$

The voltage $V_{secondary}$ is a substantially constant voltage over the on and off phases of the power switch $Q_{main}$. During the on phase, $V_{secondary}$ is negative; during the off phase $V_{secondary}$ is positive.

During the "on" phase of the power switch $Q_{main}$, the current through the resistor R is $$I_{in\_on} = -\frac{\frac{V_{IN} \times n_2}{n_1} - V_{ZCD}}{R}, \quad (6)$$

and during the "off" phase of the power switch $Q_{main}$, the current through the resistor R is $$I_{in\_off} = -\frac{\frac{(V_{IN}-V_{OUT}) \times n_2}{n_1} - V_{ZCD}}{R}. \quad (7)$$

The voltage $V_{ZCD}$ is the voltage of the pin ZCD during the on and off phases of the power switch $Q_{main}$. The voltage range for the voltage $V_{ZCD}$ in a practical circuit design is 0 to about 5 V or less.

Figure 13:
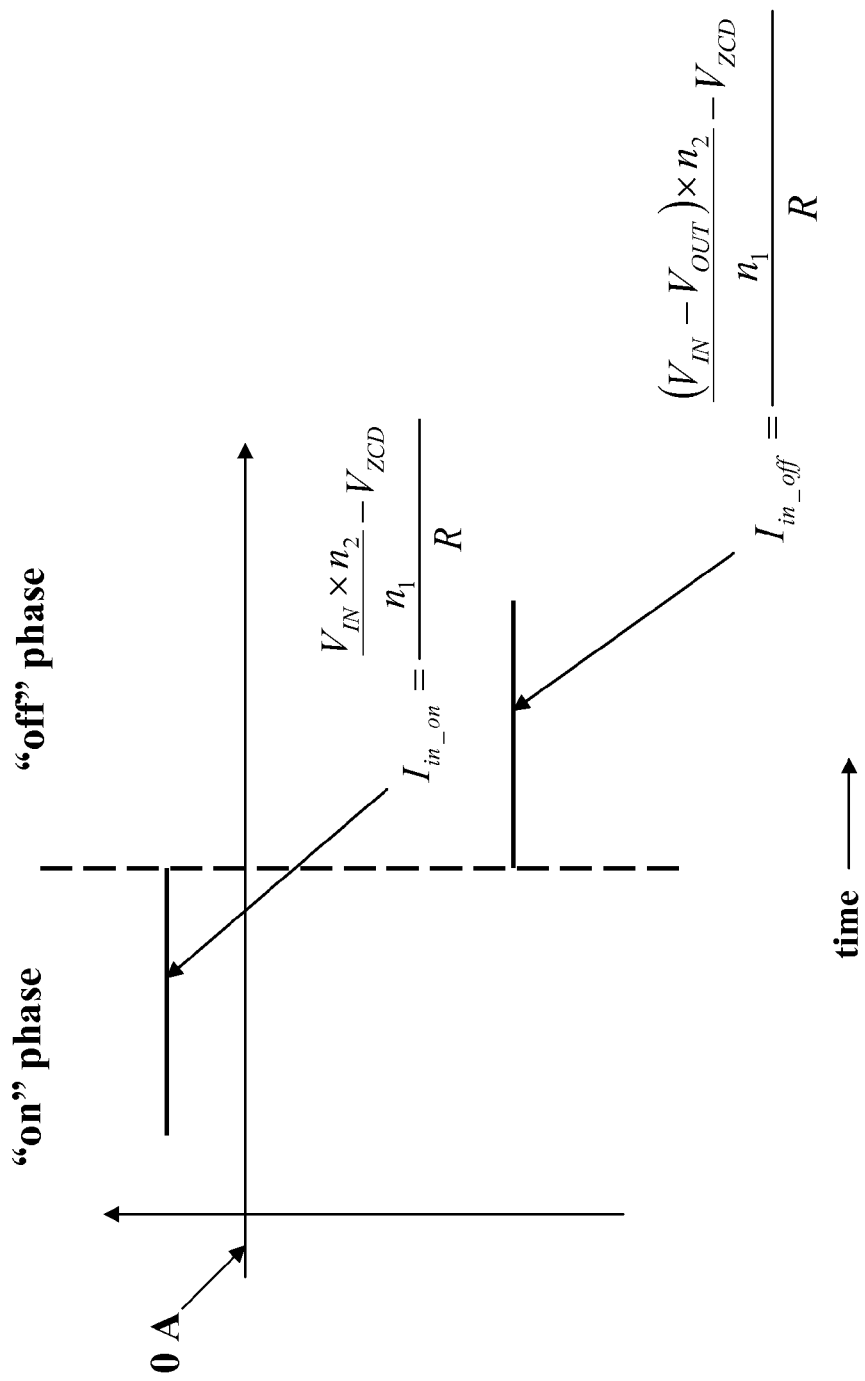
FIG. 13 illustrates waveforms associated with the circuit illustrated in FIG. 12.

A waveform illustrating the currents $I_{in\_on}$ and $I_{in\_off}$ is illustrated in FIG. 13.

If the transformer turns ratio $n_2/n_1$ is sufficiently high, the voltage $V_{secondary}$ will be relatively large compared to the voltage $V_{ZCD}$, and equation (6) and (7) can be simplified during the power switch "on" phase as illustrated by equation (8):

$$I_{in\_on} = -\frac{\frac{V_{IN} \times n_2}{n_1}}{R}, \quad (8)$$

and during the power switch "off" phase by equation (9):

$$I_{in\_off} = -\frac{\frac{(V_{IN} - V_{OUT}) \times n_2}{n_1}}{R}. \quad (9)$$

From equations (8) and (9), during the power switch "on" phase, the current $I_{in\_on}$ is negative, acting as a current sink supplying current to the controller 601, and during the power switch "off" phase, the current $I_{in\_off}$ is positive, acting as a current source, absorbing current from the controller 601.

The controller can accurately sense the current level flowing from the pin ZCD during the power switch "on" phase and the current level flowing to the pin ZCD during the power switch "off" phase. From equation (8), the controller directly estimates the value of the input voltage $V_{IN}$ from the value of $I_{in\_on}$, and using a sample-and-hold circuit capable of storing the result from the "on" phase as described previously hereinabove, evaluates both equations (8) and (9). The controller then estimates the output voltage $V_{OUT}$ from the value of $I_{in\_off}$ and the estimate as indicated above for $V_{IN}$. This procedure is implemented in an embodiment to produce the current $I_{result}$, $$I_{result} = \frac{I_{in\_on} \times R_1}{R_2} - I_{in\_off} \quad (10)$$

where $R_1$ and $R_2$ are internal resistors in the controller as illustrated in FIG. 12.

Inserting equation (8) and (9) into equation (10) produces the result shown by equation (11):

$$I_{result} = \frac{\frac{V_{IN} \times n_2}{n_1}}{R} \times R_1 - \frac{(V_{IN} - V_{OUT}) \times n_2}{R}. \quad (11)$$

If the same type and size of resistor are formed in the same silicon die, resistances can be accurately matched. Accordingly, the resistances $R_1$ and $R_2$ can be made equal so that they cancel in equation (11) above. This allows equation (11) to be simplified to equations (12) and (13):

$$I_{result} = \frac{\frac{V_{IN} \times n_2}{n_1}}{R} - \frac{\frac{(V_{IN} - V_{OUT}) \times n_2}{n_1}}{R}, \quad (12)$$

$$V_{OUT} = I_{result} \cdot \frac{R \cdot n_1}{n_2}. \quad (13)$$

Thus, using a sample-and-hold circuit, an accurate estimate of the output voltage $V_{OUT}$ can be made from the current $I_{result}$ using equations (12) and (13) and an estimate of $V_{IN}$ using equation (8).

An estimate of input current to the power converter can also be made employing the pin ZCD. The estimate of input current for power factor control purposes can be used in CCM. To produce an estimate of the input current, one can proceed as follows: During the "on" phase of the power switch $$V_{I_{in}} = \frac{V_{IN}}{L} \times R_{sense} \times t_{on}, \quad (13)$$

and during the "off" phase of the power switch, $$V_{I_{in}} = \frac{(V_{IN} - V_{OUT})}{L} \times R_{sense} \times t_{off}, \quad (14)$$

where $R_{sense}$ is the resistance of the current-sense resistor illustrated in FIGS. 1, 2, 3, and 5, L represents the inductance of the boost inductor, i.e., the magnetizing inductance of the primary winding of the transformer T, $t_{on}$ and $t_{off}$ represent the on and off times of the power switch $Q_{main}$ during a switching cycle, and $V_{I_{in}}$ in equation (13) represents the product of the current-sense resistance $R_{sense}$ times the increase in the value of the current $I_L$ during the on time of the power switch $Q_{main}$, and, in equation (14), the product of the resistance $R_{sense}$ times the decrease (a negative number) in the value of the current $I_L$ during the off time of the power switch $Q_{main}$. The average of the current $I_L$ over a portion of a switching cycle of the power switch $Q_{main}$ is substantially one-half the peak value plus the minimum value of the current $I_L$. The controller 601 intrinsically knows the value of $t_{on}$ and $t_{off}$ because it controls these values.

A power converter input current sensing pin is not employed in an embodiment as described below. An approach to estimating power converter input current as introduced herein is to sense the current flowing into the pin ZCD during the power switch "on" and "off" phases to charge an internal capacitor. The PFC operation of a controller for a power converter in the analysis below is assumed to be CCM.

To estimate the power converter input current, during the on phase of the power switch $Q_{main}$, equation (15) below is employed to relate input current to a ZCD pin to the input voltage $V_{IN}$:

$$V_{I_{in}} = \frac{V_{IN} \times n_2}{R \times n_1 \times C_{integrating}} \times t_{on}, \quad (15)$$

and during power switch off phase, equation (16) below is employed to relate input current to the ZCD pin to the difference between the input voltage $V_{IN}$ and the output voltage $V_{OUT}$:

$$V_{I_{in}} = \frac{(V_{IN} - V_{OUT}) \times n_2}{R \times n_1 \times C_{integrating}} \times t_{off}, \quad (16)$$

where $C_{integrating}$ represents the capacitance of a capacitor that integrates current flowing into the pin ZCD. Comparing equation (15) and (16) with equations (13) and (14), sensing of input current is similar, although there is a difference between the inductor and capacitor. The current in the inductor L and the voltage across the capacitor $C_{integrating}$ are related to an integral of the voltage across the inductor L. Accordingly, the waveform of the voltage across the capacitor $C_{integrating}$ is the same shape as the waveform of the input current, with a scale factor dependent on the inductance L. A difference is that the first approach represents directly sensing power converter input current, and the second approach represents indirectly sensing power converter input current. The input current to the power converter is indirectly sensed with an assumed value for the inductance L. Despite inaccuracy for the assumed value for the inductance L, a controller can nonetheless control the duty cycle of the power switch $Q_{main}$ to control the waveform of the input current to the power converter to produce a high power factor for the power converter. In place of integrating current with a capacitor, such as the capacitor $C_{integrating}$, the on times and off times of the power switch $Q_{main}$ may be employed to construct a corresponding integrated signal to produce an estimate of the input current.

Figure 14:
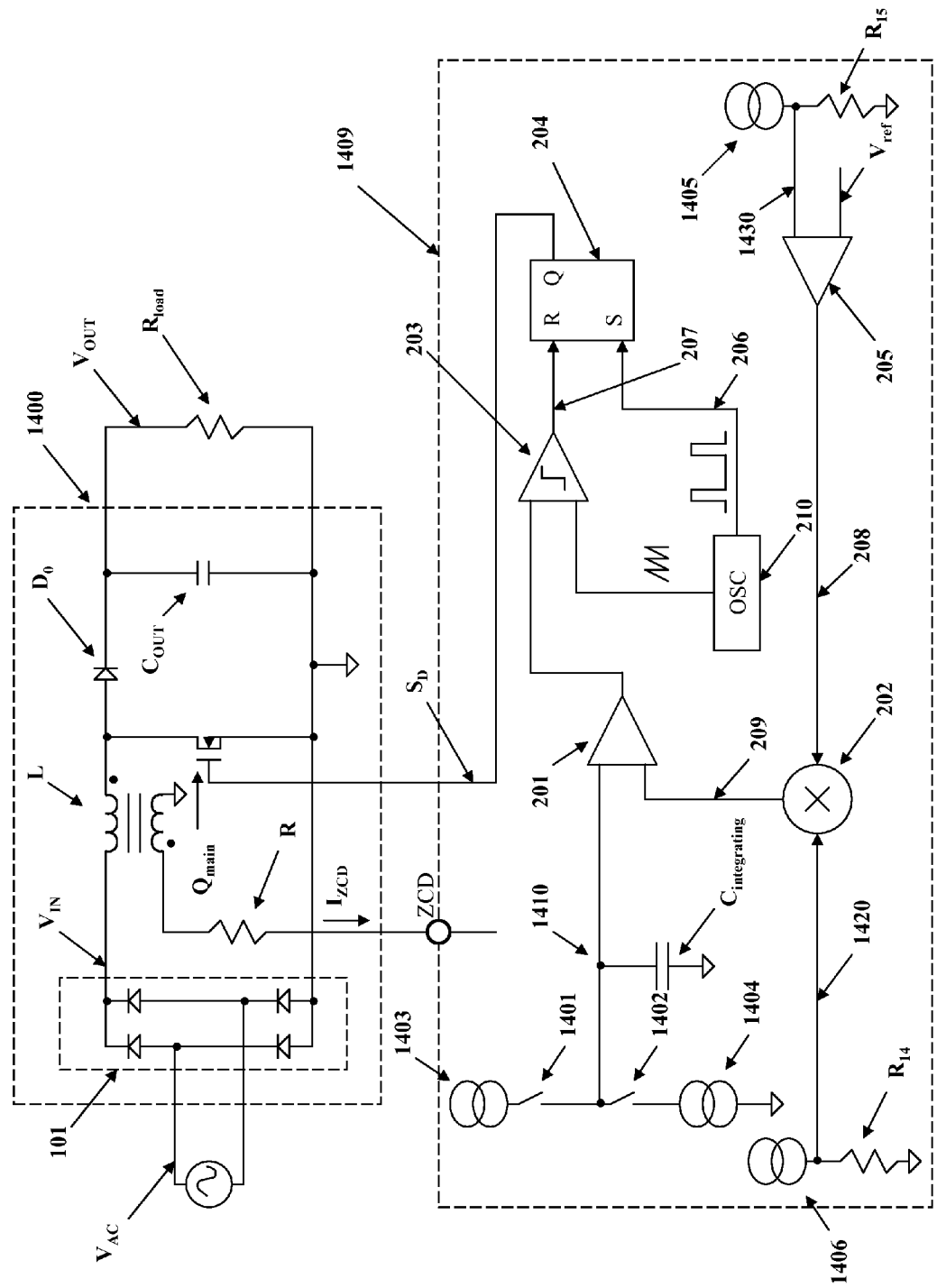
FIG. 14 illustrates a schematic drawing showing a boost power train coupled to a pin of a controller, wherein the controller provides a control signal with power factor correction for a main power switch of the boost power train in response to a current flowing into the pin, constructed according to an embodiment.

Turning now to FIG. 14, illustrated is a schematic drawing showing an embodiment of a boost power train 1400, coupled to a pin ZCD of a controller 1409. The boost power train 1400 is operable in CCM. The controller 1409 provides a control signal $S_D$ for main power switch $Q_{main}$ of the boost power train 1400 in response to a current $I_{ZCD}$ flowing into the pin ZCD. Circuit elements of the boost power train 1400 were described previously hereinabove with reference to FIGS. 1 and 6. The current $I_{ZCD}$ flowing into the pin ZCD is coupled to circuit elements (not shown in FIG. 14) that were described previously hereinabove with reference to FIGS. 7, 9, 10, and 12.

When the power switch $Q_{main}$ is turned on, current sources 1403 and 1406 are enabled to provide the current $I_{in\_on}$ described previously hereinabove and illustrated in FIG. 12. The current $I_{in\_on}$ is dependent on the rectified input voltage $V_{IN}$ to the power converter. Thus, current source 1406 in conjunction with resistor $R_{14}$ provide signal 1420 that is a measure of the rectified input voltage $V_{IN}$ to the power converter. When the power switch $Q_{main}$ is turned off, current source 1404 is enabled to provide the current $I_{in\_off}$ that was also described previously hereinabove and illustrated in FIG. 12. Switch 1401 is turned on when the power switch $Q_{main}$ is enabled to conduct, and the switch 1402 is turned on during the complementary period of time. Thus, the switches 1401 and 1402 may be controlled by the signal $S_D$ and by its compliment signal which may be produced by an inverter. In this manner, the capacitor $C_{integrating}$ integrates a current proportional to a voltage impressed across the inductor L. Accordingly, a voltage across the capacitor $C_{integrating}$ exhibits a waveform similar to the waveform of a current in the inductor L. A signal is thus produced at circuit node 1410 that replicates the waveform of the signal $I_{sense}$ illustrated in FIGS. 2 and 3. The controller 601 can adjust the duty cycle of the power switch $Q_{main}$ to adjust the amplitude of the current waveform of the input current to the power converter to regulate an output characteristic of the power converter, such as an output voltage.

Current source 1405 produces the current $I_{result}$ illustrated in FIG. 12 that in conjunction with resistor $R_{15}$ provides the signal 1430 that is a measure of the output voltage of the power converter.

In this manner, controller 1409 constructs signals that are a measure of an input and an output voltage of the power train 1400, and an estimate of a current flowing through the inductor L, employing only the pin (circuit node) ZCD. Remaining elements in controller 1409 provide power factor correction employing a multiplication operation similar to that provided by Wilkinson and illustrated in FIG. 2, enabling thereby operation in CCM.

In a practical circuit implementation, the voltage $V_{Cintegrating}$ (signal 1410) across the capacitor $C_{integrating}$ will drift, thereby producing a constant or slowly varying offset for an estimate of power converter input current. The estimate of power converter input current can be corrected, for example, by placing a high resistance across the capacitor $C_{integrating}$ and constraining the voltage $V_{Cintegrating}$ (signal 1410) across the capacitor $C_{integrating}$ to nonnegative values using analog or digital circuit techniques well known in the art. Such drift correction can be performed particularly easily in a digital circuit implementation.

Thus, input voltage, output voltage, and input current can be estimated employing the pin ZCD. Then, employing, for example and without limitation, a process similar to that used in the Texas Instruments' UC3854 controller or by Wilkinson, power factor can be accurately controlled. The process can be implemented with a digital circuit. As indicated by equations (15) and (16), a current sense resistor $R_{sense}$ such as illustrated in FIGS. 2 and 3 is not required, and it is also not required to know the inductance of the boost inductor to provide power factor control in CCM.

An advantage of an embodiment of the controller introduced herein is that the pin ZCD provides multi-functional use, including zero-current detection for current in the boost inductor to turn on a power switch, and input and output voltage sense. By estimating an input current, a conventional multiplier control approach can be employed to control the duty cycle of a power switch with power factor correction. It is not necessary to know the inductance of the boost inductor to estimate accurately the input and the output voltage. Accordingly, a stand-alone eight-pin integrated circuit for a boost PFC power converter control function can provide brownout protection, improved input current waveform distortion, and improved control-loop performance due to line voltage range selection. Control performance can advantageously be essentially the same as that of a conventional three-pin sensing approach, which is recognized to be generally more accurate than that produced by the control approaches of Hwang and Qiu. A further advantage is that greater application flexibility can be provided in a power converter because the sensed input voltage $V_{c2v}$ can be adjusted externally by means of the resistance of the resistor R. Hence a system designer can adjust the threshold for brownout protection and output overvoltage protection by selection of the resistance of the resistor R. These advantages can be provided with cost savings due to the need for one sensing pin and minimal external components coupled to the pin.

The concept has thus been introduced of controlling a power converter by sensing a plurality of operating conditions therein by sensing a current flowing through a circuit node. In an embodiment, the power converter includes a power switch and an inductor including a primary winding coupled in series with the power switch. In an embodiment, the inductor further includes a secondary winding. The power converter further includes a resistor coupled in series with the secondary winding and a controller including a circuit node coupled to the resistor, wherein the controller is configured to estimate a terminal voltage of the power converter by sensing a current flowing in the resistor to control a duty cycle of the power switch. In an embodiment, the controller senses a current flowing in a circuit node to sense the current flowing through the resistor. In an embodiment, the controller is configured to estimate an input voltage and an output voltage of the power converter by sensing the current flowing through the resistor. In an embodiment, the controller controls the duty cycle of the power switch to produce an input current waveform to the power converter that substantially replicates the waveform of an input voltage to the power converter. In an embodiment, the controller regulates an output voltage of the power converter employing the current flowing in the resistor. In an embodiment, the controller employs the current flowing through the resistor to sense a brownout condition of the input voltage to the power converter, and to disable conduction of the power switch in response to sensing the brownout condition. In an embodiment, the controller senses an output overvoltage condition of the power converter employing the current flowing through the resistor. The controller may disable conduction of the power switch in response to sensing the output overvoltage condition. In an embodiment, the controller turns on the power switch by sensing a change of current flowing through the resistor. In an embodiment, the controller adjusts an on time of the power switch in response to a current flowing through the resistor. In an embodiment, the power converter is a boost power converter substantially operated in a critical conduction mode. In an embodiment, the controller selects a line voltage range of the input voltage to the power converter by sensing a current flowing through the resistor.

In a further embodiment, the controller estimates an input current to the power converter employing the current flowing through the resistor. In an embodiment, the controller employs estimates of the input voltage and the output voltage to the power converter and the estimate of an input current to the power converter to control the duty cycle of the power switch, wherein each estimate is produced by sensing the current flowing through the resistor. In an embodiment, the controller employs a multiplication operation to control the duty cycle of the power switch. In an embodiment, the power converter is a boost power converter operated substantially in a continuous conduction mode.

In an embodiment, the input voltage to the power converter is a rectified ac line voltage.

Another exemplary embodiment provides a method of controlling a power converter. In an embodiment, the method includes forming an inductor with a primary winding and a secondary winding, and coupling the primary winding to a power switch of the power converter. The method includes coupling a resistor to the secondary winding, and producing an estimate of a terminal voltage of the power converter using a current flowing through the resistor, and controlling a duty cycle of the power switch employing the estimate of the terminal voltage. In a further embodiment, the method includes producing an estimate of an output voltage of the power converter using the current flowing through the resistor, wherein the terminal voltage is an input voltage to the power converter.

In an embodiment, the input voltage to the power converter is a rectified ac line voltage.

In an embodiment, the method further includes producing an estimate of input current to the power converter using the current flowing through the resistor. In an embodiment, the method includes producing the estimate of input current employing a capacitor to integrate the current flowing through the resistor. In a further embodiment, the method includes employing a turn-on time and a turn-off time of the power switch to produce the estimate of input current. In an embodiment, the method further includes employing a multiplication operation to control the duty cycle of the power switch using the estimates of the input voltage and the output voltage to the power converter and the estimate of an input current to the power converter. In an embodiment the method includes operating the power converter in a continuous conduction mode.

In an embodiment, the method further includes controlling the duty cycle of the power switch to produce an input current waveform to the power converter that substantially replicates the waveform of an input voltage to the power converter. In an embodiment, the method further includes regulating an output voltage of the power converter using the sensed current flowing through the resistor. In an embodiment, the method further includes sensing a brownout condition of the input voltage to the power converter using the current flowing through the resistor to disable conduction of the power switch. In an embodiment, the method further includes sensing an output overvoltage condition of the power converter using the current flowing through the resistor.

In an embodiment, the method further includes terminating an off time of the power switch using the current flowing through the resistor, and adjusting an on time of the power switch using the current flowing through the resistor. In an embodiment, the power converter is a boost power converter and the method further includes operating the power converter substantially in a critical conduction mode.

In an embodiment, the method further includes selecting a line voltage range of the input voltage to the power converter using the current flowing through the resistor.

Although utilization of a pin to sense a current and related methods have been described for application to a boost power converter, it should be understood that other applications of such utilization, such as other power conversion topologies that may be applied in a power converter application, or in a power amplifier or in a motor controller application, are contemplated within the broad scope of the invention, and need not be limited to boost power converter applications.

Although the invention has been shown and described primarily in connection with specific exemplary embodiments, it should be understood by those skilled in the art that diverse changes in the configuration and the details thereof can be made without departing from the essence and scope of the invention as defined by the claims below. The scope of the invention is therefore determined by the appended claims, and the intention is for all alterations that lie within the range of the meaning and the range of equivalence of the claims to be encompassed by the claims.

What is claimed is:

1. A power converter, comprising:
   a power switch;
   an inductor coupled in series with the power switch, wherein the inductor includes a secondary winding;
   a resistor coupled in series with the secondary winding; and
   a controller including a circuit node coupled to the resistor, wherein the controller is configured to estimate an input voltage and an output voltage of the power converter by sensing a current flowing in the resistor to control a duty cycle of the power switch, and wherein the controller is configured to select a voltage range of the input voltage of the power converter in response to the current flowing through the resistor.

2. The power converter as claimed in claim 1, wherein the input voltage of the power converter is a rectified ac line voltage.

3. The power converter as claimed in claim 2, wherein the controller is configured to control the duty cycle of the power switch to produce an input current waveform to the power converter that substantially replicates a waveform of the input voltage of the power converter.

4. The power converter as claimed in claim 1, wherein the controller is configured to regulate the output voltage of the power converter employing the current flowing through the resistor.

5. The power converter as claimed in claim 1, wherein the controller is configured to employ the current flowing through the resistor to detect a brownout condition of the input voltage of the power converter.

6. The power converter as claimed in claim 1, wherein the controller is configured to detect an output overvoltage condition of the power converter employing the current flowing through the resistor.

7. The power converter as claimed in claim 1, wherein the power converter is a boost power converter configured to operate substantially in a critical conduction mode, and wherein the controller is configured to turn on the power switch in response to sensing a change of the current flowing through the resistor.

8. The power converter as claimed in claim 1, wherein the controller is configured to adjust an on time of the power switch in response to the current flowing through the resistor.

9. The power converter as claimed in claim 1, wherein the controller is configured to estimate an input current to the power converter employing the current flowing through the resistor.

10. The power converter as claimed in claim 9, wherein the controller is configured to employ estimates of the input voltage and the output voltage of the power converter and the estimate of the input current to the power converter to control the duty cycle of the power switch, wherein each estimate is produced by sensing the current flowing through the resistor.

11. The power converter as claimed in claim 10, wherein the controller is configured to control the duty cycle of the power switch employing a multiplication operation.

12. The power converter as claimed in claim 10, wherein the power converter is a boost power converter configured to operate substantially in a continuous conduction mode.

13. A method of controlling a power converter, the method comprising:
  forming an inductor with a primary winding and a secondary winding;
  coupling the primary winding to a power switch of the power converter;
  coupling a resistor to the secondary winding;
  producing an estimate of an input voltage and an output voltage of the power converter using a current flowing in the resistor;
  selecting a voltage range of the input voltage of the power converter using the current flowing through the resistor; and
  controlling a duty cycle of the power switch employing the estimate of the input voltage and the output voltage.

14. The method as claimed in claim 13, wherein the input voltage of the power converter is a rectified ac line voltage.

15. The method as claimed in claim 13, further comprising producing the estimate of an input current to the power converter using the current flowing through the resistor.

16. The method as claimed in claim 15, further comprising employing a multiplication operation to control the duty cycle of the power switch using the estimates of the input voltage and the output voltage of the power converter and the estimate of the input current to the power converter.

17. The method as claimed in claim 13, further comprising controlling the duty cycle of the power switch to produce an input current waveform to the power converter that substantially replicates a waveform of the input voltage of the power converter.

18. The method as claimed in claim 13, further comprising regulating the output voltage of the power converter using the current flowing through the resistor.

19. The method as claimed in claim 13, further comprising sensing a brownout condition of the input voltage of the power converter using the current flowing through the resistor to disable conduction of the power switch.

20. The method as claimed in claim 13, further comprising sensing an output overvoltage condition of the power converter using the current flowing through the resistor.

21. The method as claimed in claim 13, further comprising:
  terminating an off time of the power switch using the current flowing through the resistor; and
  adjusting an on time of the power switch using the current flowing through the resistor, wherein the power converter is a boost power converter operated substantially in a critical conduction mode.

22. A power converter, comprising:
  a power switch;
  an inductor coupled in series with the power switch, wherein the inductor includes a secondary winding;
  a resistor coupled in series with the secondary winding; and
  a controller including a circuit node coupled to the resistor, wherein the controller is configured to estimate a terminal voltage of the power converter by sensing a current flowing in the resistor to control a duty cycle of the power switch, wherein the controller selects a line voltage range of an input voltage to the power converter in response to the current flowing through the resistor.

23. A method of controlling a power converter, the method comprising:
  forming an inductor with a primary winding and a secondary winding;
  coupling the primary winding to a power switch of the power converter;
  coupling a resistor to the secondary winding;
  producing an estimate of a terminal voltage of the power converter using a current flowing in the resistor;
  controlling a duty cycle of the power switch employing the estimate of the terminal voltage; and
  selecting a line voltage range of an input voltage to the power converter using the current flowing through the resistor.

* * * * *